United States Patent
Stewart et al.

(10) Patent No.: US 7,734,084 B2
(45) Date of Patent: Jun. 8, 2010

(54) METHOD AND SYSTEM FOR OFFSET ESTIMATION AND ALIGNMENT

(75) Inventors: Duncan Stewart, Palo Alto, CA (US); Carl Picciotto, Palo Alto, CA (US); Jun Gao, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 11/584,074

(22) Filed: Oct. 20, 2006

(65) Prior Publication Data
US 2008/0095407 A1   Apr. 24, 2008

(51) Int. Cl.
*G06K 9/00* (2006.01)
(52) U.S. Cl. ................................ 382/151; 382/289
(58) Field of Classification Search ................ 382/151, 382/289
See application file for complete search history.

(56) References Cited

U.S. PATENT DOCUMENTS

| | | | | |
|---|---|---|---|---|
| 4,547,800 A | * | 10/1985 | Masaki | 348/95 |
| 5,251,271 A | * | 10/1993 | Fling | 382/162 |
| 5,434,956 A | * | 7/1995 | Son et al. | 358/1.5 |
| 5,640,200 A | * | 6/1997 | Michael | 348/87 |
| 5,643,699 A | * | 7/1997 | Waldner | 430/22 |
| 5,809,171 A | * | 9/1998 | Neff et al. | 382/209 |
| 6,068,954 A | * | 5/2000 | David | 430/22 |
| 6,259,525 B1 | * | 7/2001 | David | 356/399 |
| 7,085,673 B2 | * | 8/2006 | Picciotto et al. | 702/158 |
| 7,095,885 B1 | * | 8/2006 | DeLaRosa et al. | 382/151 |
| 7,226,797 B2 | * | 6/2007 | Tong et al. | 438/5 |
| 2006/0110069 A1 | * | 5/2006 | Tong et al. | 382/294 |

* cited by examiner

*Primary Examiner*—Brian P Werner

(57) ABSTRACT

A method for determining an offset vector. The method includes obtaining an image of a first feature. An image of a second feature is also obtained. Also, a combination image of the first feature and the second feature is obtained. A plurality of composite images is utilized to determine an accurate offset vector between the first feature and the second feature in the combination image. The plurality of composite images is based on the image of the first feature and the image of the second feature.

20 Claims, 18 Drawing Sheets

METHOD AND SYSTEM FOR OFFSET ESTIMATION AND ALIGNMENT

CROSS REFERENCE TO RELATED APPLICATIONS

This application is related to previously patent application Ser. No. 10/930,614, entitled "DISPLACEMENT ESTIMATION SYSTEM AND METHOD," filed Aug. 31, 2004, now issued U.S. Pat. No. 7,085,673, issued on Aug. 1, 2006, and assigned to the assignee of the present invention. In addition, this application is related to previously patent application Ser. No. 10/995,837, entitled "SENSING ALIGNMENT OF MULTIPLE LAYERS," filed Nov. 23, 2004, now issued U.S. Pat. No. 7,226,797, issued on Jun. 5, 2007, and assigned to the assignee of the present invention.

BACKGROUND ART

Various systems exist for the purpose of positioning one or more material layers (e.g., substrates, masks, etc.) in one or more locations to allow operations to be performed on the material layers. Some systems, such as alignment systems, attempt to position substrates by aligning one or more patterns on the material layers with the goal of a zero length offset.

For example, in one scenario, the material layers are positioned substantially parallel to each other and are spaced apart by a distance that is relatively short compared to the overall dimensions of the material layers. An imaging system having an optical axis disposed perpendicular to the plane in which the material layers reside is used to image one or more alignment markers on or within each layer. Relative position is established according to alignment marker positions. Alignment markers can be provided explicitly for alignment purposes, or can comprise landmarks intrinsically present on the material layer.

In addition to using more sophisticated microscopes to identify alignment markers, Moiré or other complex patterns may be used as alignment markers for the purpose of increasing resolution. However, the use of the sophisticated microscopes and the complex patterns may add prohibitive costs to the manufacturing process.

Further, with existing alignment systems, difficulties arise when the alignment markers overlap or are otherwise co-located in such a way that it is difficult or impossible to image the alignment markers individually. Alignment becomes even more difficult when the alignment markers are of different patterns. Specifically, the overlapping alignment markers may produce multiple peaks in an array of cross correlation values when performing cross-correlation of the two alignment markers. As such, due to the multiple peaks in the array, the location of the individual alignment markers cannot be positively determined. Also, the positioning of the material layer may be poorly quantized and may not be useful in instances where a non-zero offset is desired. Further, due to process variations, alignment systems that compare different patterns across different material layers may run into performance limitations.

BRIEF DESCRIPTION OF THE DRAWINGS

The above and other objects and advantages of the present invention will be more readily appreciated from the following detailed description when read in conjunction with the accompanying drawings.

DETAILED DESCRIPTION OF THE INVENTION

Figure 1A:
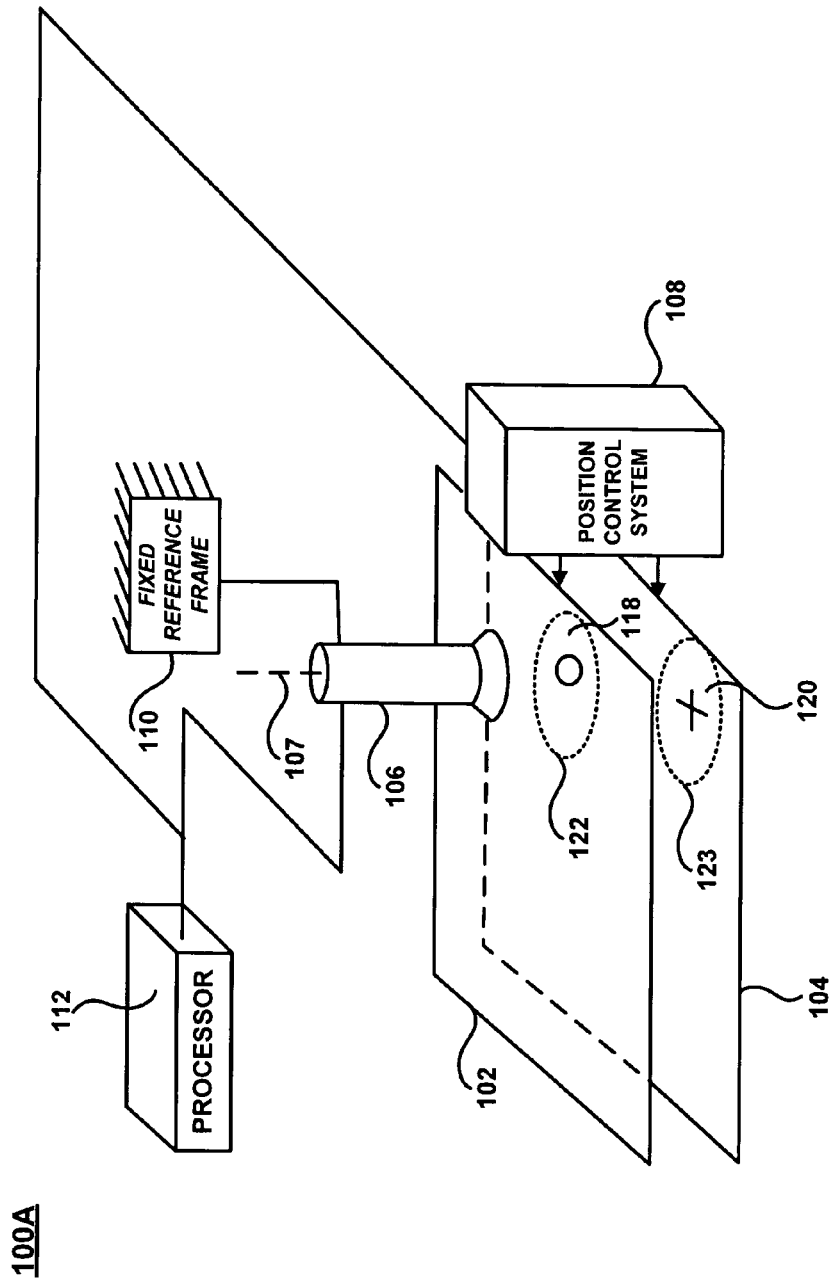
FIG. 1A illustrates a system for aligning two material layers, in accordance with one embodiment of the present invention.

Reference will now be made in detail to embodiments of the present invention, a method and system of determining an offset vector between features of at least one material layer, and the alignment state of at least two material layers for purposes of alignment, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Accordingly, various embodiments of the present invention disclose methods and systems for determining an offset vector between features of at least one material layer for the purposes of alignment. Other embodiments of the present invention provide for the above accomplishment and also provide for determining the alignment state of at least two material layers for purposes of alignment. Additionally, embodiments of the present invention provide for the determination of the alignment state of at least two material layers using alignment markers that are not identical. Also, other embodiments of the present invention provide the above accomplishments and also provide for the determination of the alignment state of at least two material layers using alignment markers that are overlapping.

Notation and Nomenclature

Embodiments of the present invention can be implemented on software running on a computer system in conjunction with an optical imaging system. The computer system can be a personal computer, notebook computer, server computer, mainframe, networked computer, workstation, and the like. This software program is operable for providing offset vectors used in determining the alignment of two or more material layers. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "obtaining," "generating," "storing," "cross-correlating," and "determining," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

FIG. 1A illustrates a system 100A for aligning at least two material layers, in accordance with one embodiment of the present invention. Specifically, system 100A is capable of determining an alignment state between material layer 102 and material layer 104. For example, material layers 102 and 104 can be a substrate layer and a mask layer, or any other layer used in a manufacturing process in which alignment markers are used.

In particular, system 100A comprises an imaging system 106 having an optical axis 107 extending through material layers 102 and 104. Imaging system 106 is fixed relative to a fixed reference frame 110. It is to be appreciated, of course, that fixed reference frame 110 may itself be in motion, either in a start-stop sense or a continuous sense, relative to another reference frame such as the floor, a fabrication machine, etc.

In one embodiment, which is described by way of illustration only and not by way of limitation, layer 102 is a mold for use in a nanoimprint lithography process. The nanoimprint lithography mold may comprise, for example, a silicon wafer having a layer of $SiO_2$ for use in a hot embossing process, or may comprise a quartz mold for use in an ultraviolet curing-based process. Material layer 104 is, for example, a resist-coated substrate, in one embodiment.

However, it is to be appreciated that the scope of the present teachings is applicable in a wide variety of other scenarios, in accordance with other embodiments of the present invention. In another embodiment, material layer 102 is a mask and material layer 104 is a sample, or substrate, in a proximity or contact lithography system.

In one embodiment, imaging system 106 comprises a single-objective microscope with a high-NA (numerical aperture) objective lens for achieving submicron resolution or better. Imaging system 106 may have a depth of field of perhaps 2-3 microns, as an example. Generally speaking, depth of field refers to a distance range around the focal plane along the optical axis at which imaging can be achieved within a desired lateral resolution. In other embodiments, lower-NA objective lenses may be used having larger field depths.

Also illustrated in FIG. 1A is a field of view (FOV) of imaging system 106. It is to be appreciated that, as used herein, FOV refers to a sub-area within a total area imaged by imaging system 106, in one embodiment. In another embodiment, FOV refers to the total area imaged by imaging system 106. As shown in FIG. 1A, with respect to material layer 102, FOV of imaging system 106 includes region 122 of material layer 102. As such, the FOV encompassing region 122 associated with material layer 102 includes an alignment marker 118 in region 122 that is in a shape of a circle. Also, with respect to material layer 104, FOV of imaging system 106 includes region 123. As such, the FOV encompassing region 123 associated with material layer 104 includes an alignment marker 120 that is in a shape of a cross. As will be described in detail below, alignment markers 118 and 120 are used to determine and adjust the alignment between material layers 102 and 104 in embodiments of the present invention.

System 100A further comprises a position control system 108 capable of translating material layers 102 and 104 by desired distances with fine tolerances. The translation of material layers 102 and 104 is accomplished for alignment sensing and/or control. More particularly, position control system 108 is capable of providing accurate alignment of two material layers 102 and 104. Specifically, position control system 108 is capable of moving one or both of material layers 102 and 104 according to an accurate difference alignment vector that is determined in accordance with embodiments of the present invention for purposes of alignment specified to sub-pixel resolution, as will be described below in more detail in relation to FIGS. 5A and 5B.

By way of example and not by way of limitation, the desired tolerances, and therefore the precision of position control system 108, may range from the order of several micrometers for some applications to the order of one nanometer, or even less, for other applications. In one embodiment, position control system 108 comprises piezoelectric actuators and/or stepper motors geared and controlled, usually with internal feedback control systems, to achieve nanometer-level precision.

In one embodiment, position control system 108 also provides for more general, larger-scale movements. For example, position control system 108 provides approximate positioning of material layers 102 and 104 for purposes of approximate alignment of two material layers 102 and 104, or may provide for the insertion and withdrawal of layers 102 and 104 into and out of the system 100A. In one embodiment, approximate positioning of material layers 102 and 104 is implemented through a human hand or human-driven positioning tool. In other embodiments, approximate positioning, as implemented by position control system 108, is realized by various automated conveyors or other positioning systems associated with micro-fabrication or nano-fabrication.

The approximate positioning and accurate positioning of position control system 108 collectively provide the material layer movement functionalities described herein. While the position control system 108 provides for both approximate positioning and accurate positioning in the present embodiment, other embodiments are well suited to separate devices or systems for performing approximate alignment or accurate alignment, in accordance with one embodiment of the present invention.

System 100A further comprises a processor 112 that interacts with imaging system 106 and position control system 108 for purposes of determining the necessary offset of material layers 102 and 104 with respect to each other in order to perform alignment, in accordance with an embodiment of the present invention. Specifically, processor 112 is capable of determining an accurate offset alignment vector and an accurate reference alignment vector for determining alignment between the material layers 102 and 104. As will be discussed in detail below, processor 112 is also capable of determining an accurate difference alignment vector that is based on the accurate offset alignment vector and the accurate reference alignment vector. The accurate difference alignment vector is used by position control system 108 to actuate relative motion of material layers 102 and 104 for purposes of alignment.

Figure 1B:
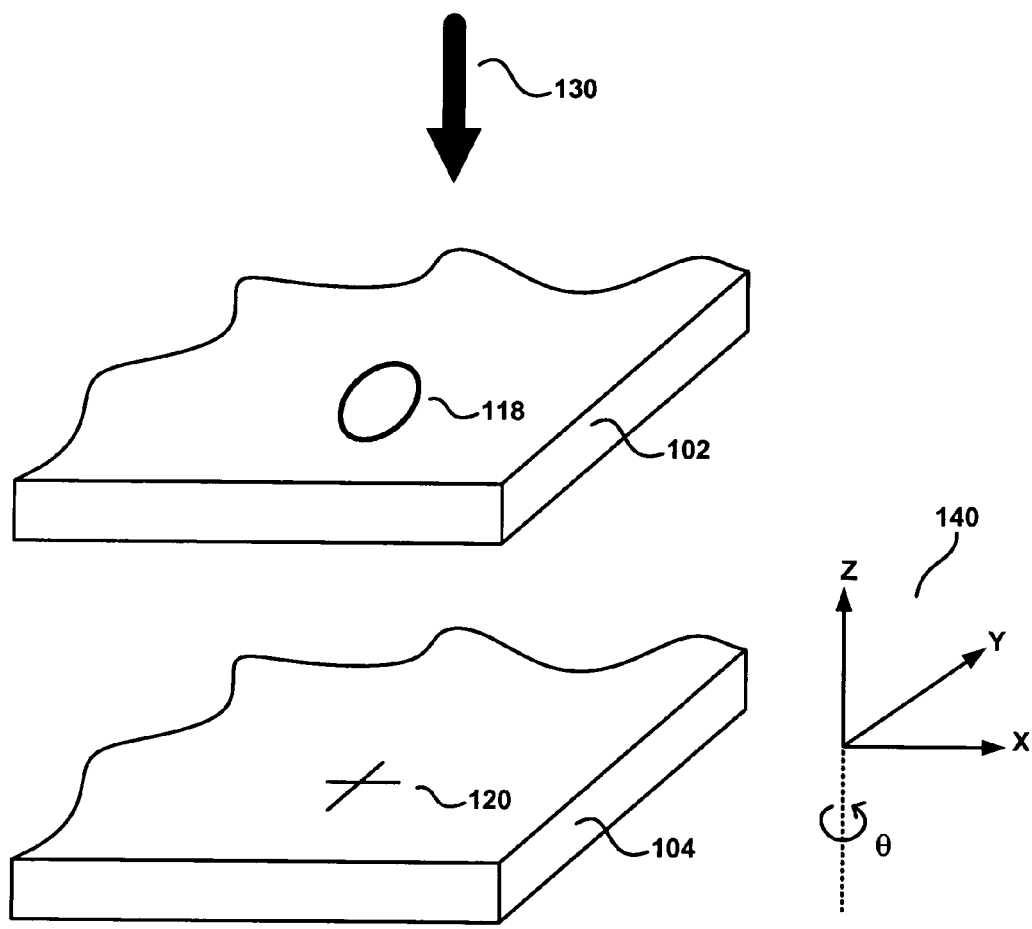
FIG. 1B is a diagram illustrating alignment markers on the two material layers of FIG. 1A, in accordance with one embodiment of the present invention.

FIG. 1B is a diagram illustrating alignment markers 118 and 120 of FIG. 1A in more detail, in accordance with one embodiment of the present invention. Specifically, arrow 130 represents the direction from which the imaging system 106 of FIG. 1A is viewing material layers 102 and 104.

FIG. 1B provides a partial view of material layer 102, and includes the portion of material layer 102 upon which alignment marker 118 is disposed. As shown, alignment marker 118 is in the shape of a circle. FIG. 1B also provides a partial view of material layer 104, and includes the portion of material layer 104 upon which alignment marker 120 is disposed. Also, as shown in FIG. 1B, alignment marker 120 is in the shape of a cross.

For illustration purposes only, alignment marker 120, in the shape of a cross, may fit entirely within alignment marker 118, in the shape of a circle, in one embodiment. While alignment markers 118 and 120 are of particular sizes and shapes in the present embodiment, other embodiments are well suited to alignment markers including other sizes and shapes. For example, the alignment markers may include other man-made or naturally occurring marks. In particular, in contrast to conventional systems and methods, embodiments of the present invention are capable of determining the alignment state of two or more material layers using overlapping alignment markers of the same pattern, or different patterns.

Reference coordinate system 140 is also shown in FIG. 1B, and includes an x-axis, y-axis, and a z-axis. For purposes of illustration only, the material layers 102 and 104 are in parallel with the x-y plane defined by the reference coordinate system 140. As such, position control system 108 of embodiments of the present invention is capable of moving material layer 102 in the x-direction and y-direction as defined by reference coordinate system 140 for purposes of alignment. Also, position control system 108, of embodiments of the present invention, is capable of moving material layer 104 in the x-direction and y-direction as defined by reference coordinate system 140, for purposes of alignment. In addition, position control system 108 of embodiments of the present invention is capable of rotating material layers 102 and 104, independently, around the z-axis, as represented by the angle θ, in other embodiments of the present invention.

Figure 1C:
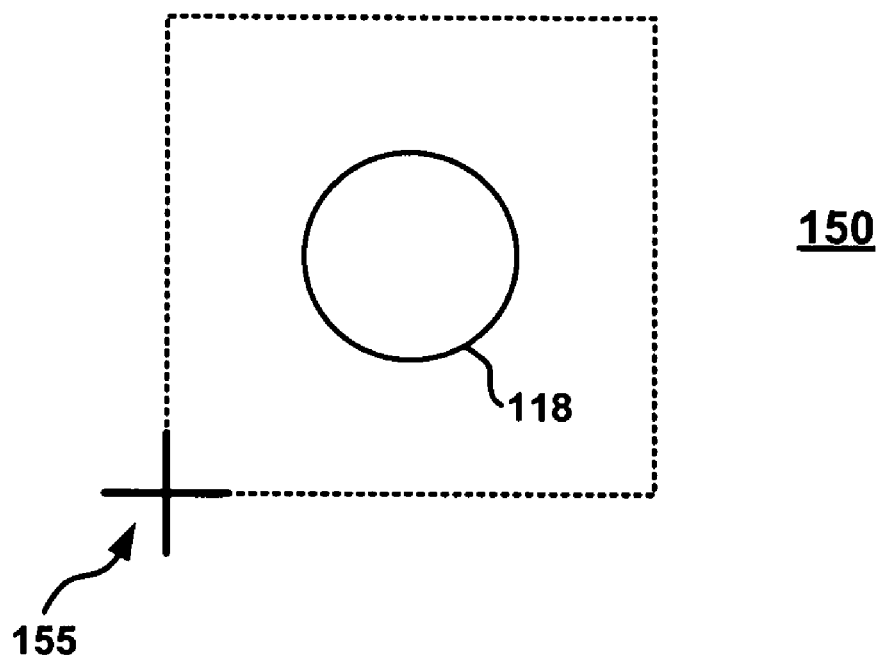
FIG. 1C illustrates an alignment marker of a material layer of FIG. 1A, in accordance with one embodiment of the present invention.

FIG. 1C is a diagram of an image 150 taken of alignment marker 118, in accordance with one embodiment of the present invention. For instance, imaging system 106 is configured to separately obtain image 150 of alignment marker 118. In one embodiment, image 150 of alignment marker 118 is obtained from material layer 102. In another embodiment, image 150 is obtained from a different material layer that includes an identical representation of alignment marker 118. Image 150 is stored for purposes of aligning material layers 102 and 104, in accordance with one embodiment of the present invention. Specifically, image 150 is stored for later retrieval for purposes of generating composite images representing various relative offsets of alignment marker 118 and alignment marker 120, as will be described more fully below in relation to FIGS. 4A, 4B, 4C, and 4D Also, an arbitrary coordinate system is assigned to image 150. In one embodiment, the origin 155 of the arbitrary coordinate system, where x=0 and y=0, is assigned to the bottom left hand corner of image 150.

Figure 1D:
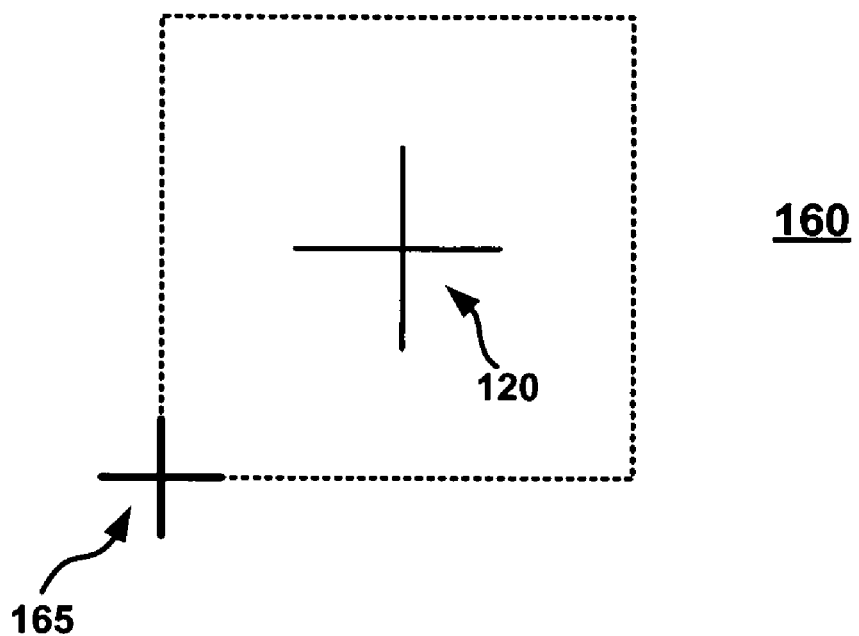
FIG. 1D illustrates another alignment marker of a material layer of FIG. 1A, in accordance with one embodiment of the present invention.

FIG. 1D is a diagram of an image 160 taken of alignment marker 120, in accordance with one embodiment of the present invention. For instance, imaging system 106 is configured to separately obtain image 160 of alignment marker 120. Furthermore, in one embodiment, image 160 of alignment marker 120 is obtained from material layer 104. In another embodiment, image 160 is obtained from a different material layer that includes an identical representation of alignment marker 120. Image 160 is stored for purposes of aligning material layers 102 and 104, in accordance with one embodiment of the present invention. Specifically, image 160 is stored for later retrieval for purposes of generating composite images representing various relative offsets of alignment marker 118 and alignment marker 120, as will be described more fully below in relation to FIGS. 4A and 4B.

Also, an arbitrary coordinate system is assigned to image 160. In one embodiment, the origin 165 of the arbitrary coordinate system, where x=0 and y=0, is assigned to the bottom left hand corner of image 160. Although the positioning of the arbitrary coordinate systems of FIGS. 1C and 1D with respect to images 150 and 160, respectively, are the same, it is to be understood that the positioning of arbitrary coordinate systems of FIGS. 1C and 1D could be different. That is, the position of origin 155 with respect to image 150 may be different than the position of origin 165 with respect to its corresponding image 160.

Figure 1E:
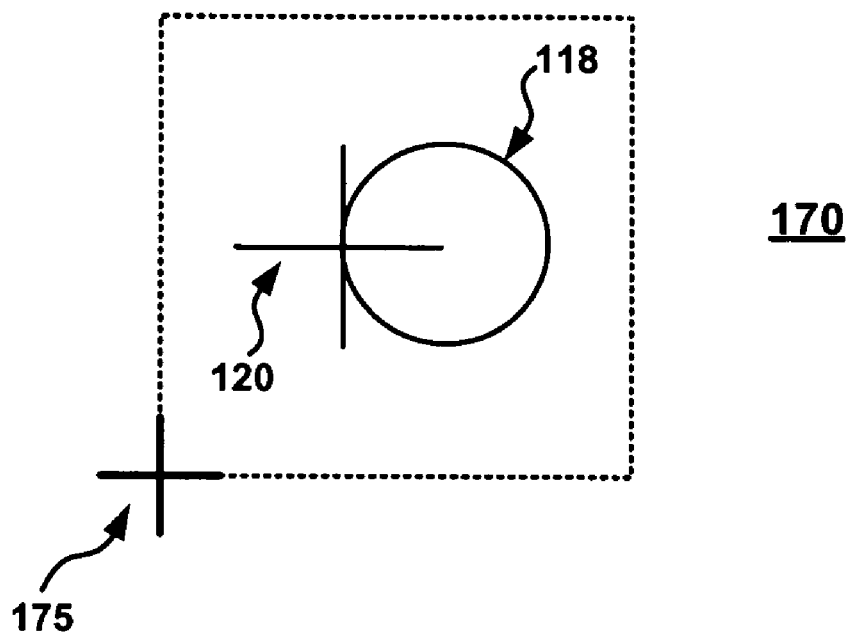
FIG. 1E illustrates an alignment of the alignment markers shown in FIGS. 1C and 1D, in accordance with one embodiment of the present invention.

FIG. 1E is a diagram of a live combination image 170 of both alignment marker 118 and alignment marker 120, in accordance with one embodiment of the present invention. For instance, imaging system 106 is configured to obtain live combination image 170 showing material layer 102 overlaid with material layer 104. As such, both alignment marker 118 of material layer 102 and alignment marker 120 of material layer 104 are visible within live combination image 170. Live combination image 170 is stored for later retrieval for purposes of aligning material layers 102 and 104, in accordance with one embodiment. Specifically, as will be described below, live combination image 170 is utilized for purposes of determining an accurate offset alignment vector defining the relative positions of alignment marker 118 and alignment marker 120 with respect to each other in a reference coordinate system (e.g., reference coordinate system 140).

As shown in FIG. 1E, live combination image 170 illustrates the overlapping of alignment marker 118 and alignment marker 120. Specifically, when viewed from imaging system 106, alignment marker 118 and alignment marker 120 overlap each other. That is, within FOV 122 of imaging system 106, alignment marker 118 is co-located with alignment marker 120. As such, distinguishing features of either alignment marker 118 or alignment marker 120 may be difficult to resolve due to the overlapping condition. While conventional methods for alignment could not effectively determine the offset of alignment marker 118 from alignment marker 120, embodiments of the present invention are capable of determining the alignment states of alignment marker 118 and alignment marker 120 in a reference coordinate system 140. In particular, embodiments of the present invention are capable of determining the alignment states of alignment marker 118 and alignment marker 120 without separately and independently imaging the material layers 102 and 104.

Also, an arbitrary coordinate system is assigned to live combination image 170. In one embodiment, the origin 175 of the arbitrary coordinate system, where x=0 and y=0, is assigned to the bottom left hand corner of live combination image 170. Although the positioning of arbitrary coordinate system 175 is the same as arbitrary coordinate systems 155 and 165 of FIGS. 1C and 1D, it is to be understood that the positioning of arbitrary coordinate systems of FIGS. 1C, 1D, and 1E each could be different from one another.

Figure 1F:
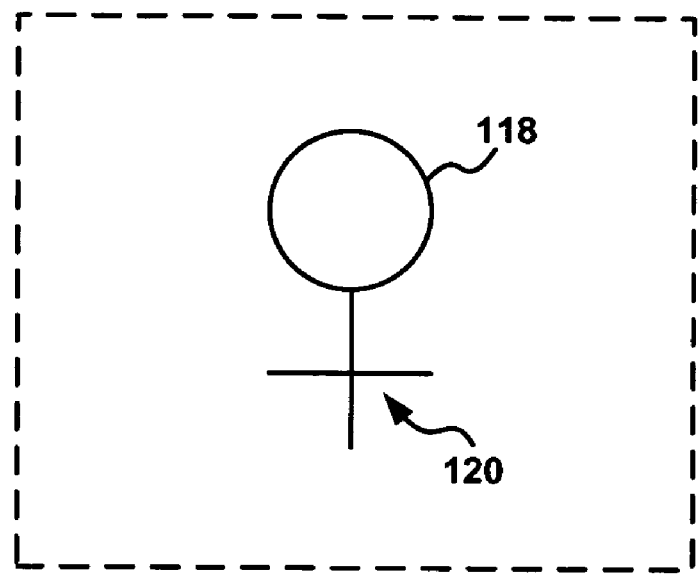
FIG. 1F illustrates an accurate reference alignment of the alignment markers illustrated in FIGS. 1C and 1D, in accordance with one embodiment of the present invention.

FIG. 1F illustrates an example reference alignment combination image 232 and illustrates the target alignment or configuration of alignment marker 118 with respect to alignment marker 120, in accordance with one embodiment of the present invention. Specifically, the target alignment provides that alignment marker 118 is located above alignment marker 120. In one embodiment, reference alignment combination image 232 is obtained from a representation or drawing of alignment marker 118 and alignment marker 120 that is created by a computer aided design (C.A.D.) system. In other embodiments, alignment reference image 232 is obtained from optical imaging systems (e.g., imaging system 106), such that an optimized arrangement of alignment marker 118 and alignment marker 120 is used. In still other embodiments, alignment reference image 232 is obtained from non-optical imaging systems (e.g., an electron microscope system).

For purposes of describing embodiments of the present invention, an offset vector defines the relative offset between two features, or objects. More particularly, an approximate offset vector defines the relative offset between two features when the offset is specified to within a threshold (e.g., within a few pixels). An accurate offset vector defines the relative offset between two features when the offset is specified to sub-pixel accuracy or resolution.

Figure 1G:
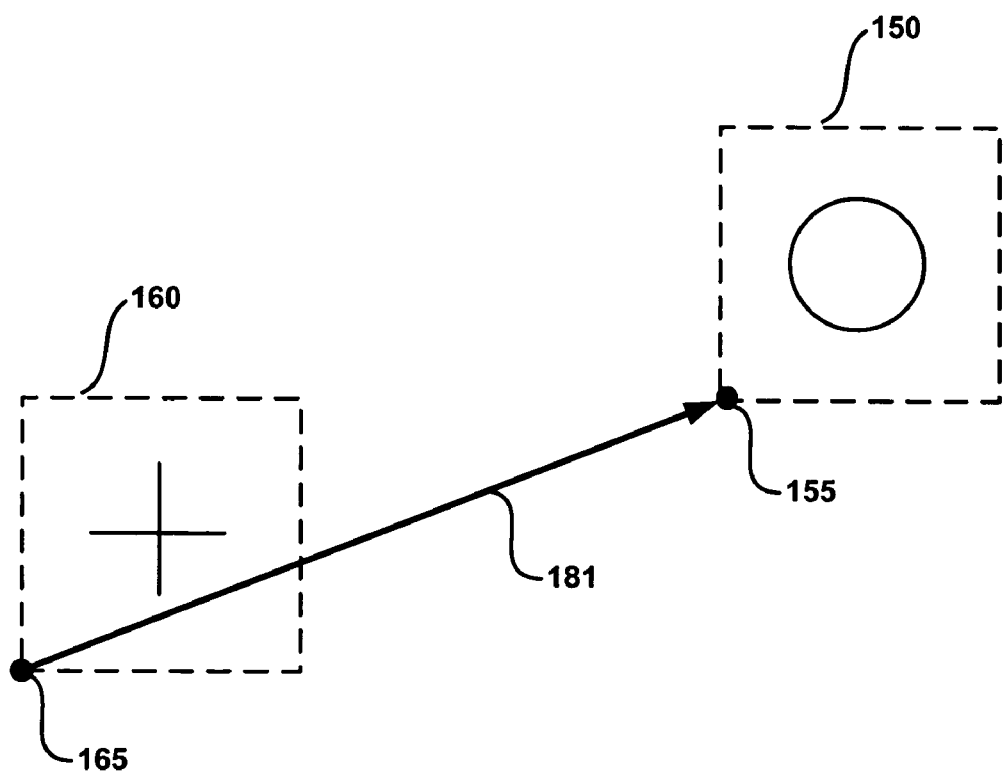
FIG. 1G is a diagram illustrating an approximate offset vector, in accordance with one embodiment of the present invention.

For example, FIG. 1G illustrates, in general, an offset vector 181, in accordance with one embodiment of the present invention. Offset vector 181 defines the relative offset between alignment marker 118 and alignment marker 120 as represented in alignment marker image 150 and alignment marker image 160. More particularly, offset vector 181 is representative of an approximate offset vector when the alignment marker images 150 and 160 do not overlap. In one embodiment, offset vector 181 is drawn between the bottom left hand corner 165 of image 160 and the bottom left hand corner 155 of image 150; however, other embodiments can define offset vector 181 with respect to other relative points (e.g., top right hand corner) in image 150 and image 160.

Figure 1H:
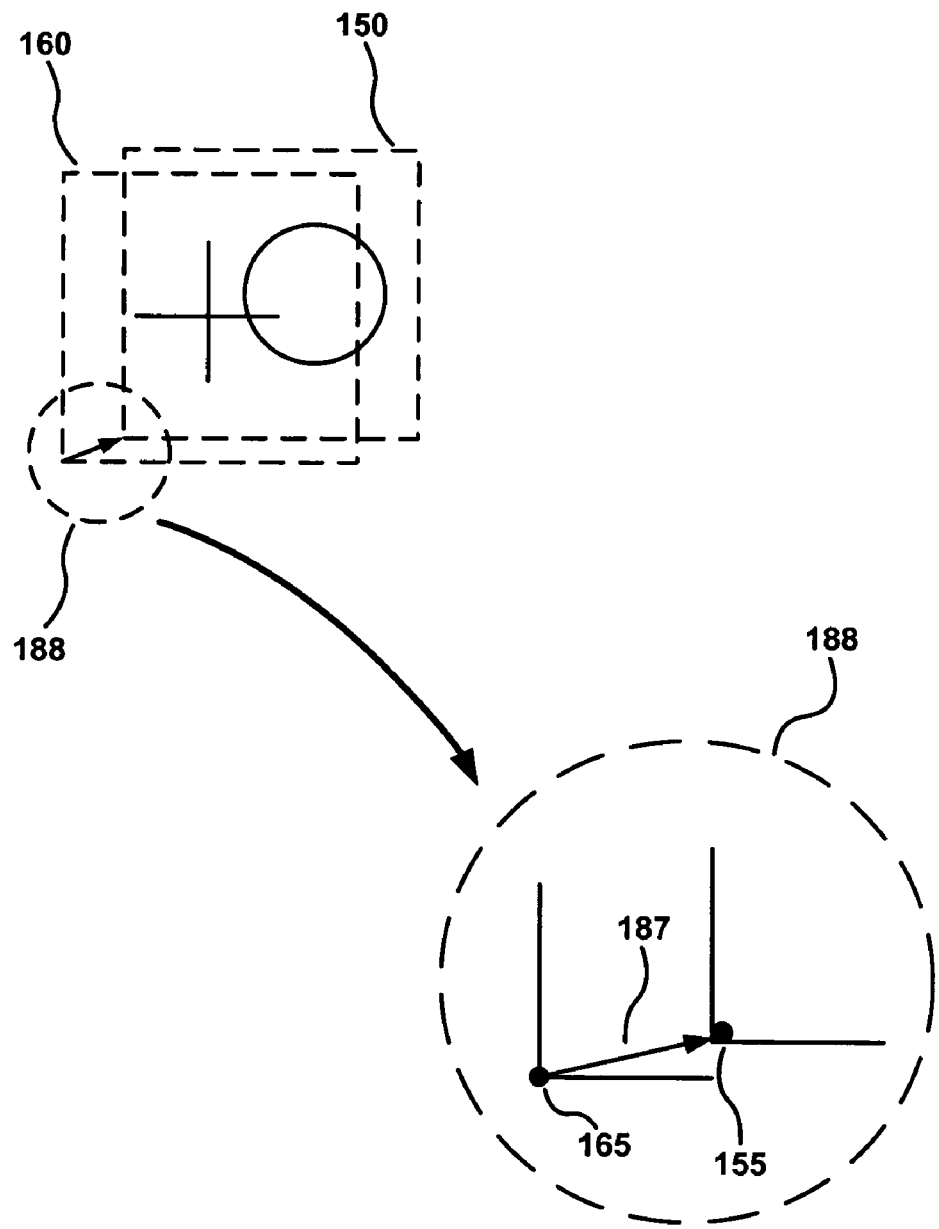
FIG. 1H is a diagram illustrating a close-up of an accurate offset vector, in accordance with one embodiment of the present invention.

FIG. 1H illustrates an offset vector 187, in accordance with one embodiment of the present invention. Offset vector 187 defines the relative offset between alignment marker 118 and alignment marker 120 as represented in alignment marker image 150 and alignment marker image 160. More particularly, offset vector 187 is representative of an approximate offset vector when the alignment marker images 150 and 160 are overlapping. As shown in FIG. 1H, a blow-up of isolation area 188 illustrates offset vector 187 drawn between the bottom left hand corner 165 of image 160 and the bottom left hand corner 155 of image 150.

Figure 2:
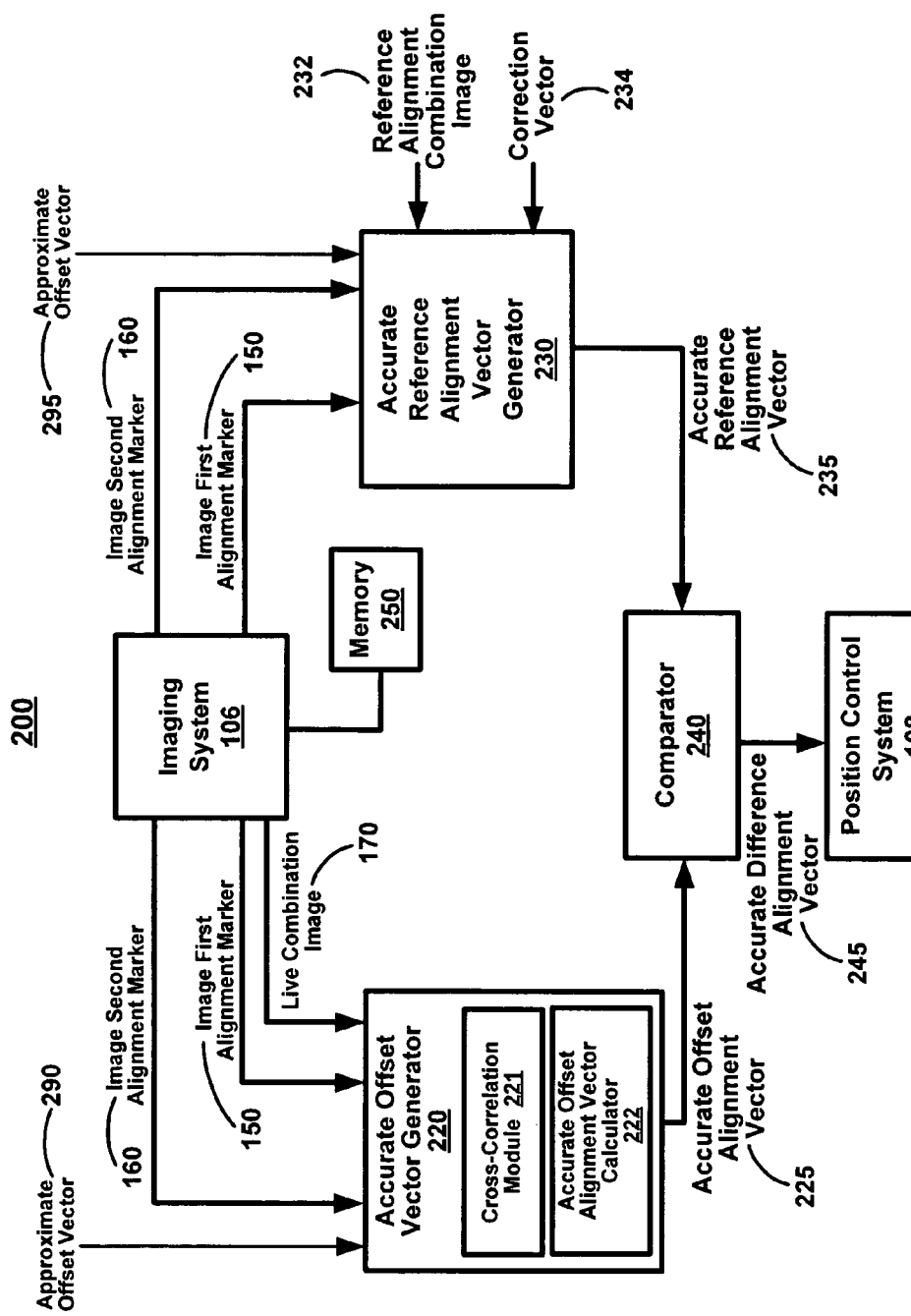
FIG. 2 is a system used for determining an alignment state of two material layers, in accordance with one embodiment of the present invention.

FIG. 2 is a block diagram of an alignment system 200 that is capable of determining the offset between at least two material layers, and moving the relative position of the material layers according to the offset, in accordance with one embodiment of the present invention. In particular, in embodiments of the present invention, alignment system 200, as illustrated in FIG. 2 is capable of determining an alignment state between two material layers when alignment markers are non-overlapping, overlapping, and when the alignment markers are of the same or different shapes, in accordance with embodiments of the present invention. For purposes of illustration only, alignment system 200 is described in relation to aligning material layer 102 and material layer 104 using alignment markers 118 and 120 for purpose of aligning material layer 102 and material layer 104. However, it is understood that alignment system 200 is capable of aligning two or more material layers.

Alignment system 200 includes an imaging system 106, memory 250, an accurate offset vector generator 220, an accurate reference alignment vector generator 230, a comparator 240, and a position control system 108. In one embodiment, accurate offset vector generator 220, accurate reference alignment vector generator 230, and comparator 240 are included within processor 112 of FIG. 1A for purposes of determining alignment between two material layers, such as material layers 102 and 104.

Imaging system 106 is configured to obtain and store images of alignment markers that are associated with one or more material layers. Specifically, in one embodiment, imaging system 106 is configured to obtain an image of a first alignment marker that is associated with a first material layer, and an image of a second alignment marker that is associated with a second layer. For instance, imaging system 106 is configured to obtain image 150 of alignment marker 118 that is associated with material layer 102. Also, imaging system 106 is configured to obtain image 160 of alignment marker 120 that is associated with material layer 104.

In particular, imaging system 106 acquires separate through-lens images of alignment marker 118 and alignment marker 120. For example, in one embodiment, imaging system 106 separately obtains image 150 of alignment marker 118 from material layer 102. Also, imaging system 106 separately obtains image 160 of alignment marker 120 from material layer 104.

In one embodiment, image 150 of alignment marker 118 is stored in memory 250 and is provided as an output from either imaging system 106 or directly from memory 250. Also, image 160 of alignment marker 120 is stored in memory 250 and is provided as an output either from imaging system 106 or directly from memory 250.

Further, imaging system 106 is configured to obtain a combination image of the first alignment marker superimposed over the second alignment marker. With respect to the example provided in FIG. 1A, imaging system 106, of the present embodiment, is configured to obtain live combination image 170 of alignment marker 118 superimposed over alignment marker 120, or vice versa. That is, imaging system 106 separately obtains live combination image 170 when material layer 102 is overlaid with material layer 104, or vice versa. That is, imaging system 106 acquires a separate through-lens image of live combination image 170. Also, live combination image 170 is stored in memory 250 and provided as an output either from imaging system 106 or directly from memory 250.

Still in another embodiment, common mode errors are corrected for in image 150 of alignment marker 118, image 160 of alignment marker 120, and live combination image 170. That is, the imaging system 106 is calibrated to remove common mode errors, such as those due to dirty optics. In one embodiment, by way of illustration, common mode errors of imaging system 106 are removed by separately acquiring a clear image without a corresponding alignment marker, and then acquiring an image with the corresponding alignment marker. Features or marks that are common between the two images are removed as common mode errors.

As shown in FIG. 2, a reference alignment combination image 232 is provided to accurate reference alignment vector generator 230, in accordance with one embodiment of the present invention. Reference alignment combination image 232 represents the target alignment of alignment marker 118 with respect to alignment marker 120. FIG. 1F provides an example illustration of reference alignment combination image 232.

In another embodiment, a correction factor is input to accurate reference alignment vector generator 230. In one embodiment, correction factor 234 comprises a vector. As such, a correction vector 234 is input to accurate reference alignment vector generator 230. Correction vector 234 provides further resolution of reference alignment combination image 232. For example, an electron microscope may be used to further define the alignment of alignment markers in the reference alignment combination image 232. In particular, correction vector 234 is considered when determining accurate reference alignment vector 235. That is, the vector corresponding to the correction factor is applied to accurate reference alignment vector 235.

Image 150, image 160, live combination image 170, and approximate offset vector 290 are provided to an accurate offset vector generator 220. Accurate offset vector generator 220 is configured to utilize a first plurality of composite images (e.g., plurality of composite images 420 of FIG. 4A) based on image 150 and image 160 to determine an accurate offset alignment vector 225 between alignment marker 118 in image 150 and alignment marker 120 in image 160 as provided in live combination image 170. That is, accurate offset alignment vector 225 provides the relative positioning of alignment marker 118 in image 150 in relation to alignment marker 120 in image 160 as provided in live combination image 170.

More specifically, accurate offset vector generator 220 includes a cross correlation module 221 and an accurate offset alignment vector calculator 222, in one embodiment. Cross-correlation module 221 is configured to cross-correlate a plurality of the plurality of composite images 420 with live combination image 170 to generate a plurality of correlation values. The generation and implementation of the plurality of composite images 420 are described more fully below in relation to FIG. 4A, 4B, 4C, and 4D. Thereafter, accurate offset alignment vector calculator 222 is configured to determine an extremum of maximum correlation based on the plurality of correlation values. Accurate offset alignment vector calculator 222 determines accurate offset alignment vector 225 based on the extremum of maximum correlation. Determination of accurate offset alignment vector 225 is provided more fully in the discussion related to FIG. 3C provided below.

Also, image 150 of alignment marker 118 and image 160 of alignment marker 120 are provided to an accurate reference alignment vector generator 230. In addition, a reference alignment combination image 232 is provided to accurate reference alignment vector generator 230. Specifically, reference alignment combination image 232 is provided as a target image. That is, reference alignment combination image 232 provides the desired relative positioning of alignment marker 118 in image 150 with respect to alignment marker 120 in image 160 in an arbitrary coordinate system. Also, an approximate offset vector 295 is provided to accurate reference alignment vector generator 230.

For example, FIG. 1F illustrates reference alignment combination image 232 and illustrates the target or desired alignment of alignment marker 118 with respect to alignment marker 120. Specifically, the target alignment provides that alignment marker 118 is located above alignment marker 120.

As such, accurate reference alignment vector generator 230 is configured to utilize a second plurality of composite images based on image 150 and image 160 to determine an accurate reference alignment vector 235, which defines the desired relative positioning between alignment marker 118 in image 150 and alignment marker 120 in image 160 as provided in reference alignment combination image 232. Determination of accurate reference alignment vector 235 is provided more fully below in the discussion related to FIG. 3C.

The alignment system 200 also includes a comparator 240. The comparator is configured to compare accurate offset alignment vector 225 with accurate reference alignment vector 235 to derive an accurate difference alignment vector 245. Accurate reference alignment vector 235 defines the desired or target relative positioning of the material layer 102 and material layer 104. In one embodiment the accurate difference alignment vector defines the movement of alignment marker 118 with respect to alignment marker 120 required to align alignment marker 118 and alignment marker 120 as provided in reference alignment combination image 232 starting from an alignment state defined in live combination image 170.

As such, position control system 108 is capable of aligning the first material layer associated with first alignment marker and the second material layer associated with the second alignment marker based on an alignment vector. That is, in the example of FIGS. 1A-H, position control system 108 is able to displace material layer 102 with respect to material layer 104 based on accurate difference alignment vector 245. Specifically, position control system 108 actuates relative motion of material layer 102 with respect to material layer 104 according to alignment vector 245.

Figure 3A:
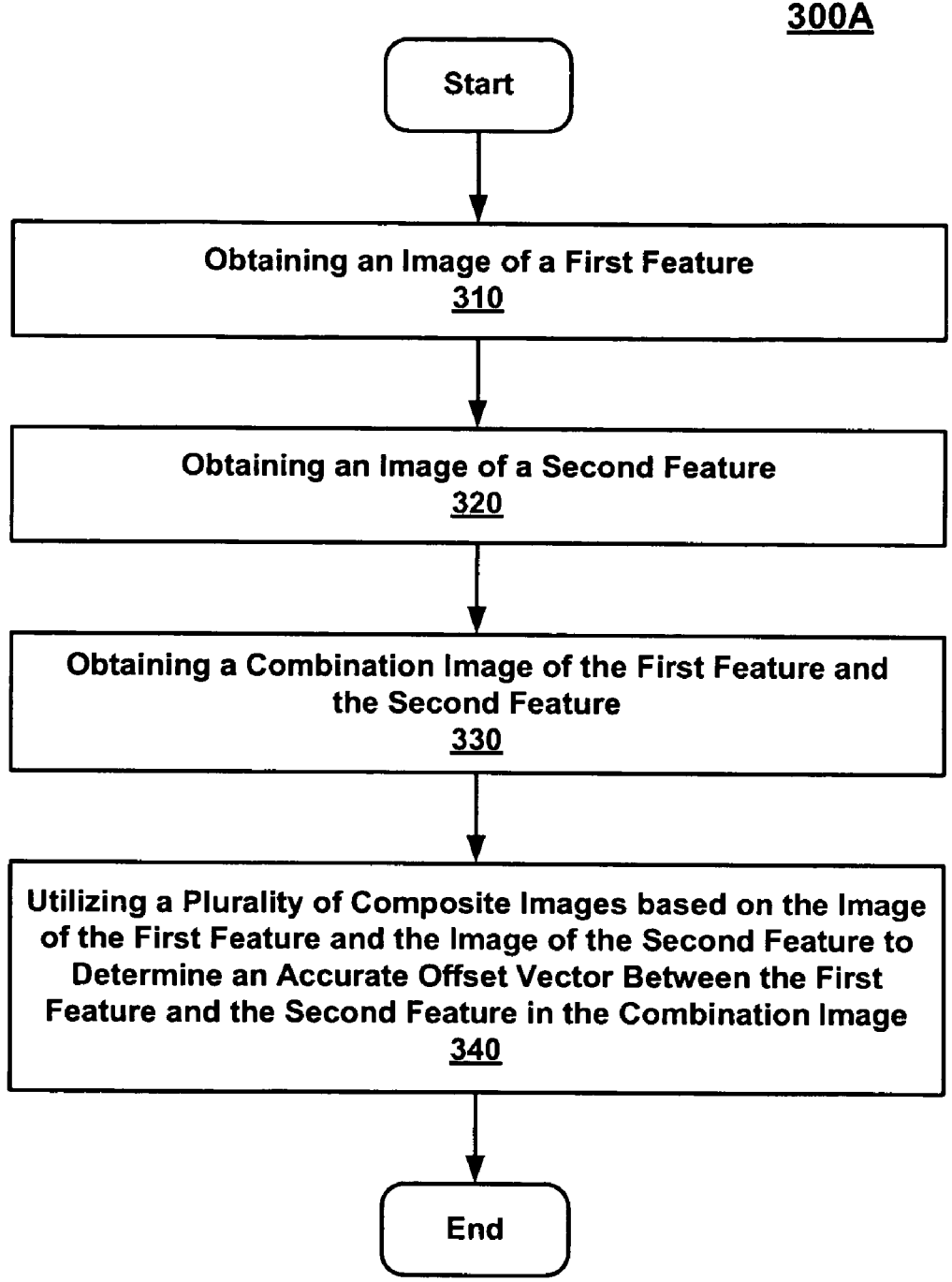
FIG. 3A is a flow diagram illustrating a method for determining an accurate offset vector, in accordance with one embodiment of the present invention.

FIG. 3A is a flow diagram 300A illustrating a method for determining an accurate offset vector between features of at least one material layer, in accordance with one embodiment of the present invention. In one embodiment, the method of FIG. 3A calculates an accurate offset vector between two features associated with a first material layer and a second material layer that are overlaid with each other. Specifically, the accurate offset vector defines the relative positioning of the features in an arbitrary coordinate system.

For purposes of illustration only, FIG. 3A is described in relation to the example provided in FIG. 1A. That is, the method of FIG. 3A is described for determining the relative offset of alignment marker 118 of material layer 102 and alignment marker 120 of material layer 104. However, it is understood, that in other embodiments of the present invention, the relative offset of alignment markers of one or more material layers can be determined using the method described in FIG. 3A. For instance, a single layer can comprises a combination of multiple layers for purposes of determining relative offset of multiple alignment markers. Specifically, embodiments of the present invention are capable of determining an offset vector defining the relative positioning of a first alignment marker with respect to a second alignment marker in an arbitrary coordinate system. Moreover, embodiments of the present invention are capable of determining the offset vector when the alignment markers are not identical. Also, embodiments of the present invention are capable of determining the offset vector when the alignment markers are overlapped.

Although the present embodiment is described with two alignment markers that are associated with at least one material layer, other embodiments are well suited to determining offset vectors between three or more alignment markers corresponding to one or more material layers.

At 310, the present embodiment, obtains an image of the first feature (e.g., naturally occurring or man-made alignment markers). That is, in the example of FIGS. 1A-H, imaging system 106 is capable of acquiring image 150 of alignment marker 118. Image 150 is stored for later retrieval. That is, image 150 can be obtained, retrieved, or received, at a later time for purposes of determining alignment.

At 320, the present embodiment obtains an image of the second feature. That is, imaging system 106 is capable of acquiring image 160 of alignment marker 120. Image 160 is stored for later retrieval. That is, image 160 can be obtained, retrieved, or received, at a later time for purposes of determining alignment.

At 330, the present embodiment obtains an appropriate combination image of the first feature and the second feature. For instance, in the example of FIGS. 1A-H, in one embodiment, imaging system 106 is capable of acquiring live combination image 170 of alignment markers 118 and 120. Live combination image 170 is stored for later retrieval. That is, live combination image 170 can be obtained, retrieved, or received, at a later time for purposes of determining alignment. In another embodiment, the reference alignment combination image 232 is obtained for purposes of determining the target or reference alignment between alignment markers 118 and 120.

At 340, the present embodiment utilizes a plurality of composite images based on the image of the first feature and the image of said second feature to determine an accurate offset vector between the first feature and the second feature in the combination image. For instance, accurate offset vector generator 220, and more particularly, accurate offset alignment vector calculator 222 is capable of utilizing a plurality of composite images that are based on image 150 and image 160 to determine accurate offset alignment vector 225. Also, in another example, accurate reference alignment vector generator 230 is capable of utilizing a second plurality of composite images based on image 150 and image 160 to determine accurate reference alignment vector 235. The operations performed at 340 are described more fully below in relation to FIG. 3B.

Figure 3B:
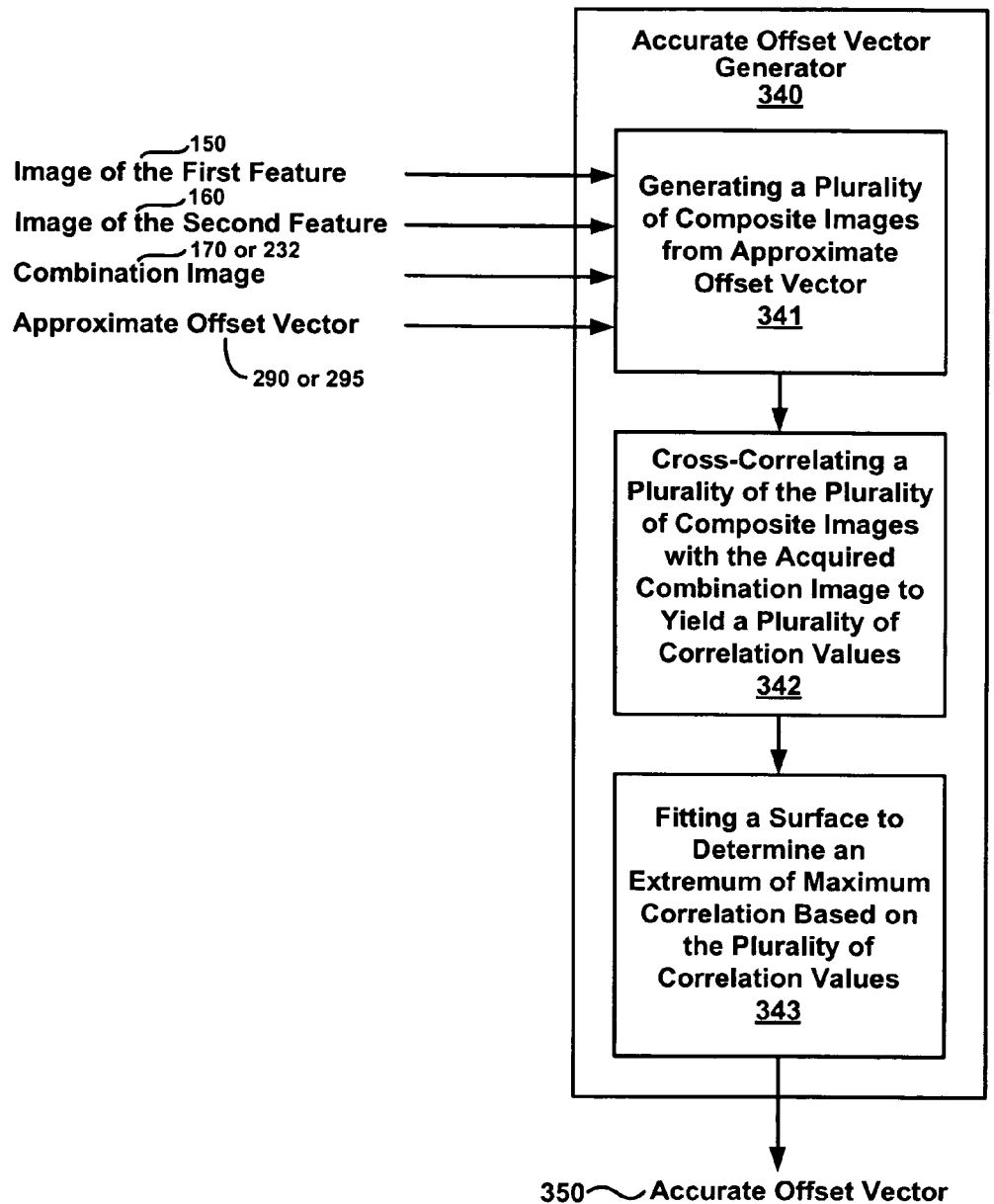
FIG. 3B is a data flow diagram illustrating the operations of an accurate offset vector generator, in accordance with one embodiment of the present invention.
Figure 3C:
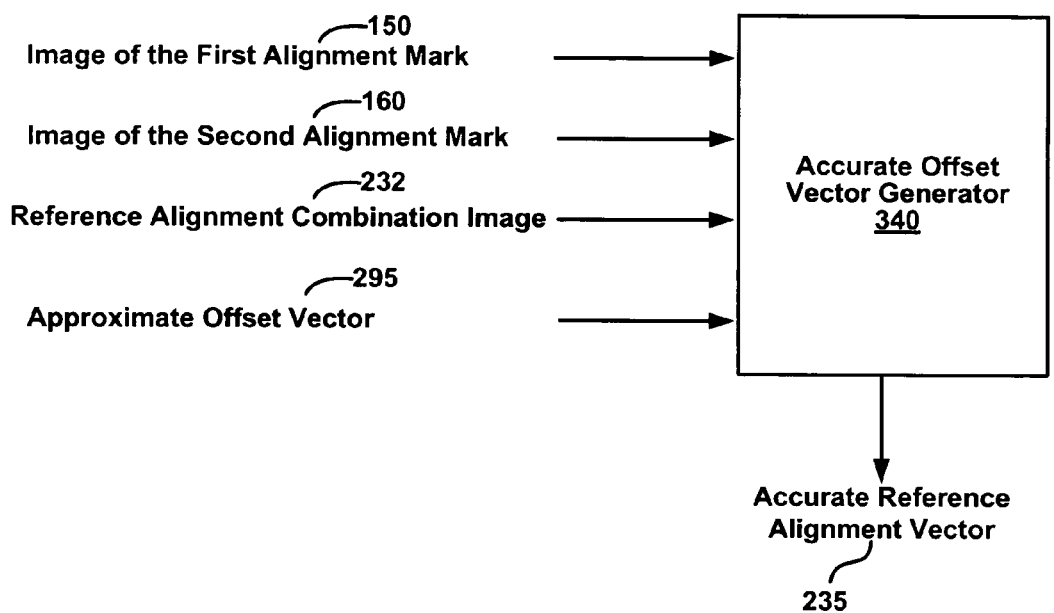
FIG. 3C illustrates the determination of an accurate reference alignment vector using the accurate offset vector generator of FIG. 3B, in accordance with one embodiment of the present invention.

FIG. 3B is a data flow diagram illustrating the operations of an accurate offset vector generator 340, in accordance with one embodiment of the present invention. As shown, data flow diagram 300B illustrates a method for determining an accurate offset vector between features of at least one material layer, in accordance with one embodiment of the present invention. The flow diagram 300B provides in more detail the operations performed at 340 of FIG. 3A to determine an accurate offset vector, generally. In the example of FIG. 1A-H and FIG. 2, accurate offset vector generator 340 is representative of accurate offset vector generator 220 and accurate reference alignment vector generator 230. As such, accurate offset vector generator 340 produces an accurate offset vector 350 between alignment marker 118 of material layer 102 and alignment marker 120 of material layer 104. Depending on the inputs to the accurate offset vector generator 340, accurate offset vector 350 could represent the accurate offset alignment vector 225 or accurate reference alignment vector 235.

As shown in flow diagram 300B, accurate offset vector generator 340 obtains as inputs an image of a first feature, an image of a second feature, a combination image, and an approximate offset vector. Specifically, in the example of FIGS. 1A-H, accurate offset vector generator 340 obtains as inputs, image 150 of alignment marker 118, image 160 of alignment marker 120, image 170 of both alignment markers 118 and 120 in a superimposed configuration, and an approximate offset vector 290.

The approximate offset vector 290 provides an initial and coarse estimate of the offset of alignment marker 118 and alignment marker 120 when alignment marker 118 is overlaid with alignment marker 120, or vice versa. For example, in one embodiment, approximate offset vector 290 is calculated to pixel resolution using coarse searching algorithms (e.g., cross-correlation). In another embodiment, the approximate offset vector is determined from user input. In still another embodiment, the approximate offset vector is zero. Also, in another embodiment, the approximate offset vector is determined from the approximate offset vector calculated from a previous iteration of the method of flow diagram 300A.

At 341, accurate offset vector generator 340 generates a plurality of composite images from approximate offset vector 290. In one embodiment, approximate offset vector 290 corresponds to a plurality of composite images based on image 150 and 160. That is, the approximate offset vector 290 corresponds to a position or starting point from which the plurality of composite images can be generated. Specifically, each of the plurality of composite images corresponds to a different relative offset of the alignment markers 118 and 120 in the vicinity of approximate offset vector 290. A description of the generation of the plurality of composite images used to determine accurate offset vector 350 is provided below in relation to FIGS. 4A, 4B, 4C, and 4D.

At 342, the accurate offset vector generator 340 cross correlates a plurality of the plurality of composite images. In one embodiment, each of the plurality of composite images is cross-correlated. Specifically, cross correlation module 221 cross correlates the plurality of the plurality of composite images with live combination image 170 to yield a plurality of correlation values.

At 343, the accurate offset vector generator 340 generates accurate offset vector 350. Specifically, accurate offset alignment vector calculator 222 fits a surface to the plurality of correlation values in order to determine an extremum of maximum correlation. The extremum of maximum correlation is utilized to determine accurate offset vector 350, as will be described below in relation to FIGS. 4A, 4B, 4C, and 4D.

FIG. 3C is a data flow diagram illustrating the operations of one implementation of accurate offset vector generator 340, in accordance with one embodiment of the present invention. Specifically, as shown in FIG. 3C, accurate offset vector generator 340 is representative of accurate reference alignment vector generator 230. As such, depending on the inputs, the operations performed by accurate offset vector generator 340 are analogous to the operations performed by accurate reference alignment vector generator 230 to generate an accurate reference alignment vector 235.

As shown in FIG. 3C, the accurate offset vector generator 340 obtains as inputs an image of the first alignment marker 150, image of the second alignment marker 160, reference alignment combination image 232, and approximate offset vector 295. As a result, accurate offset vector generator 340 is able to generate accurate reference alignment vector 235 based on the inputs.

FIGS. 4A, 4B, 4C, and 4D illustrate the generation of the plurality of composite images used in determining an accurate offset vector, in accordance with embodiments of the present invention. For purposes of illustration, the example of FIGS. 1A-H are used to describe the implementation of determining accurate offset alignment vector 225. Specifically, the plurality of composite images are cross-correlated with the live combination image 170 to determine accurate offset alignment vector 225.

Figure 4A:
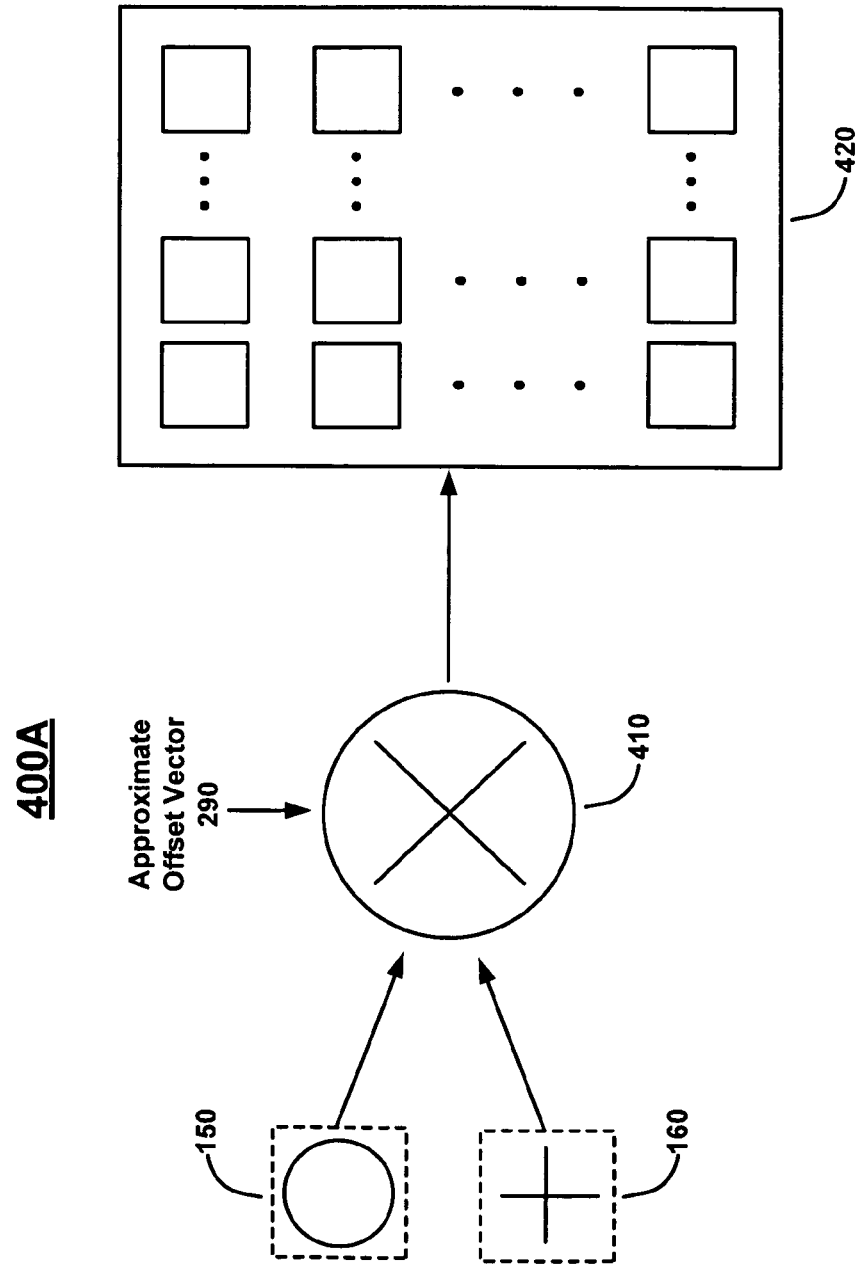
FIG. 4A is a data flow diagram illustrating the generation of an ordered array of a plurality of composite images, in accordance with one embodiment of the present invention.

FIG. 4A is a data flow diagram 400A illustrating the process used to generate a plurality of composite images 420. Specifically, the plurality of composite images 420 is generated from image 150 of alignment marker 118 and from image 160 of alignment marker 120, that were previously acquired and stored. That is, alignment marker 118 in image 150 and alignment marker 120 in image 160 are provided as inputs to combination function module 410. Additionally, approximate offset vector 290 is provided as an input to combination function module 410.

Module 410 applies a combination function on alignment marker image 150 and alignment marker image 160 to generate a family or plurality of composite images 420. Each of the plurality of composite images represents a different relative offset, and a corresponding relative offset vector, of alignment marker 118 with respect to alignment marker 120. Specifically, the plurality of composite images is based on approximate offset vector 290.

In particular, in one embodiment, an OR operation, as the combination function, is performed when generating a composite image. As such, alignment markers can be represented in a two state system. For example, a pixel is designated black when the alignment marker is visible at that pixel, and white when the alignment marker is not visible at that pixel. As such, overlapping pixel points of two different alignment markers remain black, and spaces where no mark is visible are white. In another embodiment, an AND operation is performed when generating the composite image. In still other embodiments, a weighting function is applied to generate the plurality of composite images 420.

In other embodiments, more sophisticated techniques are used to generate the plurality of composite images 420. For example, gray shading can be implemented to define varying degrees of overlapping between two features. In still other embodiments, color shading can be implemented to define varying degrees of overlapping between two features that are color images. Inclusion of these various techniques could possibly increase the accuracy when calculating accurate offset alignment vector 225 to some pixel resolution.

Figure 4B:
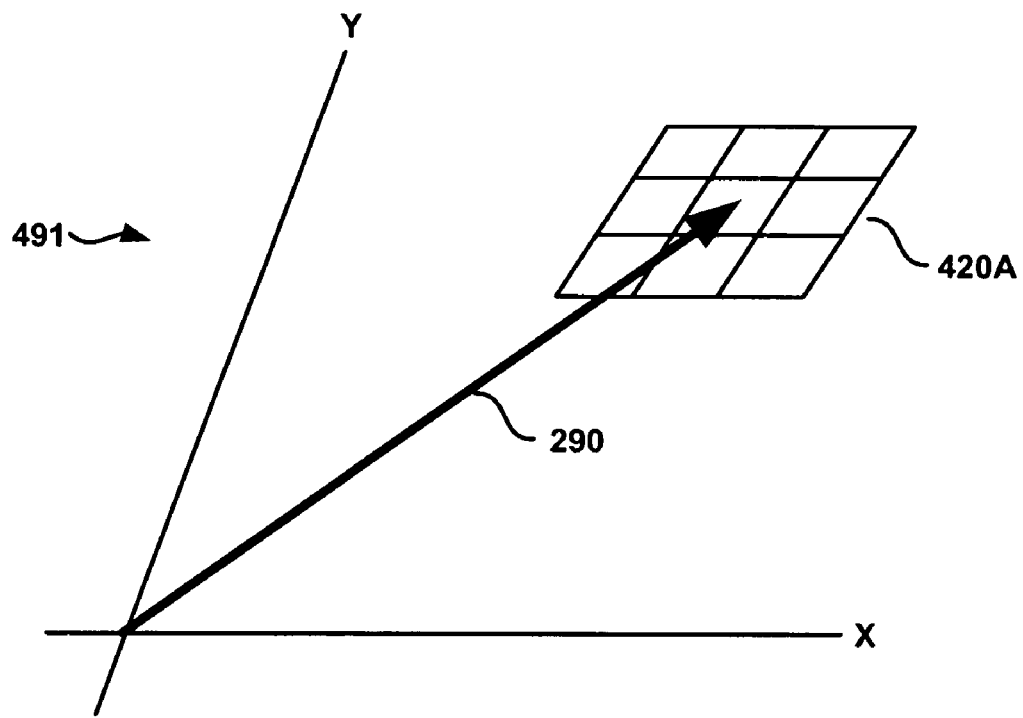
FIG. 4B is a diagram illustrating an ordered array of a plurality of offset vectors corresponding to an approximate offset vector, in accordance with one embodiment of the present invention.

FIG. 4B is a diagram illustrating an ordered array 420A of a plurality of offset vectors that correspond to approximate offset vector 290, in accordance with one embodiment of the present invention. Specifically, in one embodiment of the present invention, a family of comparison frames comprise the composite images of ordered array 420A. For instance, an N×N family of composite images can be created in the ordered array 420A of composite images, in accordance with one embodiment of the present invention.

In one embodiment, the composite images in ordered array 420A are centered on approximate offset vector 290 in the x-y plane of an arbitrary coordinate system 491. The composite images are created by combining alignment marker image 150 and alignment marker image 160 via combination module 410. That is, each of the plurality of composite images 420 is associated with an offset vector that is used to describe the relative offset between alignment markers 118 and 120. As such, each of the offset vectors provide a possible relative offset of alignment marker 118 with respect to alignment marker 120.

In one embodiment, the relative offsets of alignment markers 118 and 120 in the composite images of ordered array 420A are based on integer pixel intervals. That is, the shifting of alignment marker 118 in relation to alignment marker 120 in the arbitrary coordinate system occurs on an integer pixel basis. In another embodiment, the relative offsets of alignment markers 118 and 120 in the composite images of ordered array 420A are based on sub-pixel intervals. That is, the shifting of alignment marker 118 in relation to alignment marker 120 in the arbitrary coordinate system occurs on a sub-pixel basis.

A plurality of the plurality of composite images 420 is cross-correlated with the live combination image 170 to generate a plurality of correlation values, in accordance with one embodiment of the present invention. Specifically, cross-correlation module 221 performs cross-correlation between a composite image and the live combination image 170 to determine how close of a match the composite image is to live combination image 170. That is, the correlation value gives an indication of how closely correlated the composite image is to live combination image 170. The correlation value with maximum strength identifies the most probable relative location of alignment markers 118 and 120 of material layers 102 and 104, respectively, to sub-pixel accuracy.

In one embodiment, pixel-wise correlations (e.g., approximated correlations using sums of squared pixel differences) are performed for the plurality of composite images 420. In other embodiments, other cross-correlation techniques are suitable for determining correlation values.

Figure 4C:
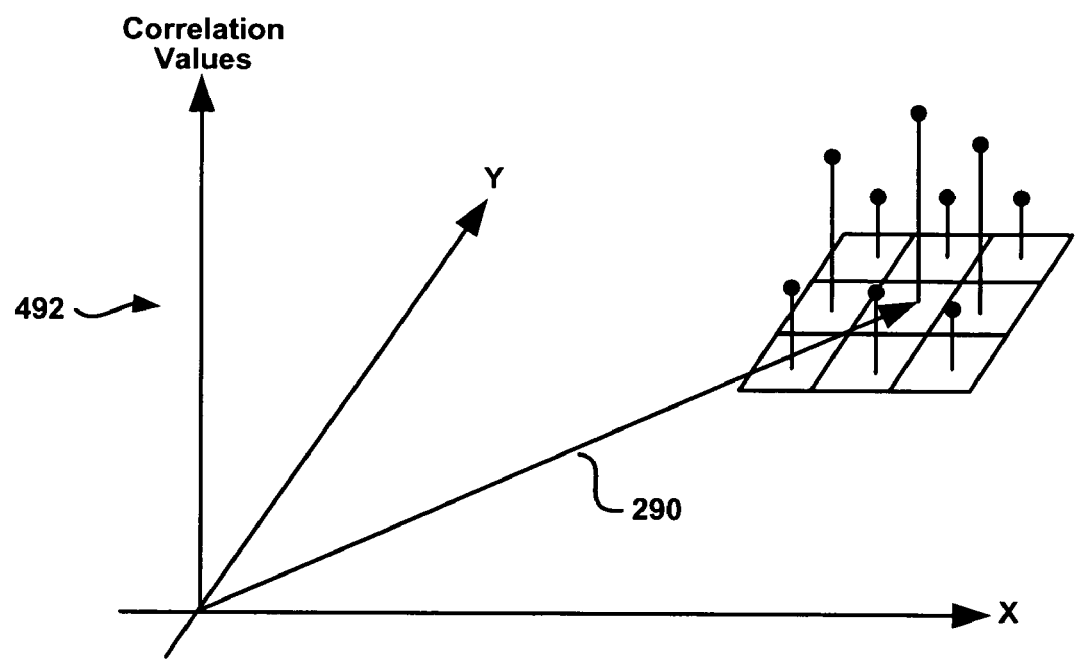
FIG. 4C is a diagram illustrating a plurality of cross-correlation values corresponding to the ordered array of FIG. 4B, in accordance with one embodiment of the present invention.

FIG. 4C is a diagram illustrating a plurality of cross-correlation values corresponding to the ordered array 420A of FIG. 4B, in accordance with one embodiment of the present invention. As shown in FIG. 4C, an arbitrary coordinate system 492 includes the same x-y plane as the arbitrary coordinate system 491 of FIG. 4B. As such, approximate offset vector 290 is the same in FIGS. 4B and 4A.

The arbitrary coordinate system 492 includes a z-axis representing correlation values. As such, correlation values for the ordered array 420 can be plotted to determine an extremum of maximum correlation. More specifically, each of the composite images in the ordered array 420 is cross-correlated with the live combination image 170. As such, each of the composite images is associated with a corresponding correlation value that indicates how closely the corresponding composite image matches or correlates with live combination image 170.

Figure 4D:
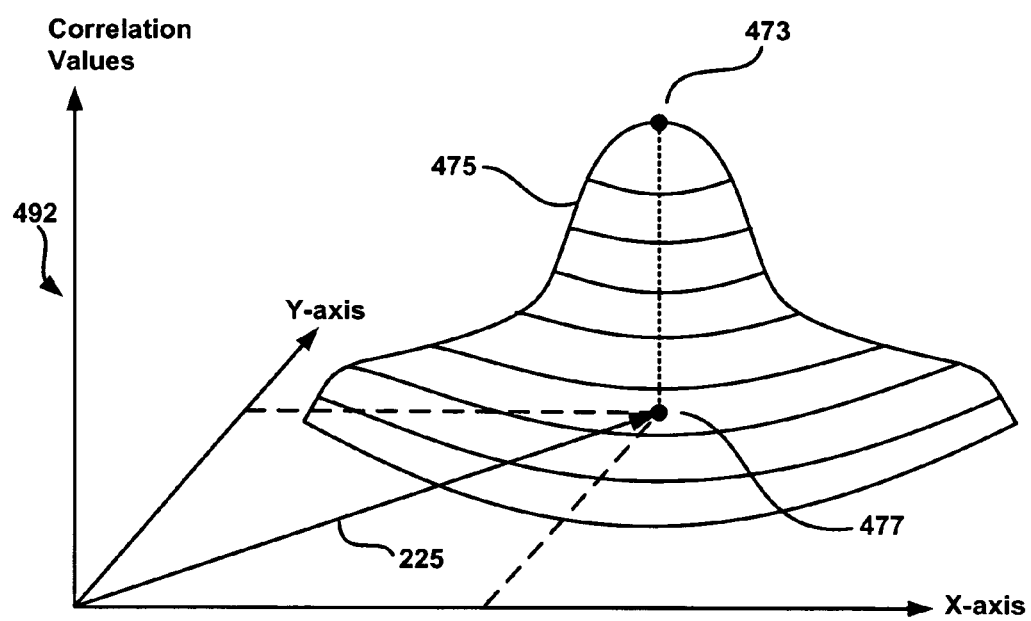
FIG. 4D is a diagram illustrating the shape fitting of the plurality of correlation values associated with the plurality of offset vectors of FIG. 4B, in accordance with one embodiment of the present invention.

FIG. 4D is a diagram illustrating the shape fitting of the plurality of correlation values associated with the ordered array 420A of FIGS. 4B and 4C, in accordance with one embodiment of the present invention. Specifically, FIG. 4D is a plot diagram 400D of the cross-correlation values calculated for each of the plurality of composite images in the ordered array 420A, in accordance with one embodiment of the present invention. An arbitrary coordinate system 492 is provided with the z-axis showing correlation values for points defined in the x-y plane.

In FIG. 4D, a surface 475 is fitted to the plurality of correlation values. That is, each of the plurality of correlation values associated with ordered array 420A can be plotted in the arbitrary coordinate system 492, and a surface 475 can be fitted to the plotted points. Examples of curves and surfaces suitable for fitting surface 475 include, but are not limited to, a 2-dimensional (2-D) paraboloid, a 2-D Gaussian surface, and a 2-D Lorentzian surface.

The present embodiment is capable of locating the extremum of maximum correlation for surface 475. As shown in FIG. 4D, point 473 corresponds to the extremum of maximum correlation for surface 475. Point 473 also corresponds to point 477 in the x-y plane of the coordinate system shown in FIG. 4D. Point 477 corresponds to the accurate offset vector 225 that is based on the extremum of maximum correlation. As such, the accurate offset vector 225 identifies the most probable offset vector between alignment marker 118 and alignment marker 120 as provided in combination image 170 to sub-pixel accuracy.

In embodiments of the present invention, plot diagram 400D can provide increasing degrees of sub-pixel resolution. For instance, in one embodiment, gray shading is implemented to provide sub-pixel resolution. In other embodiments color shading is implemented to provide sub-pixel resolution for color images.

Figure 5A:
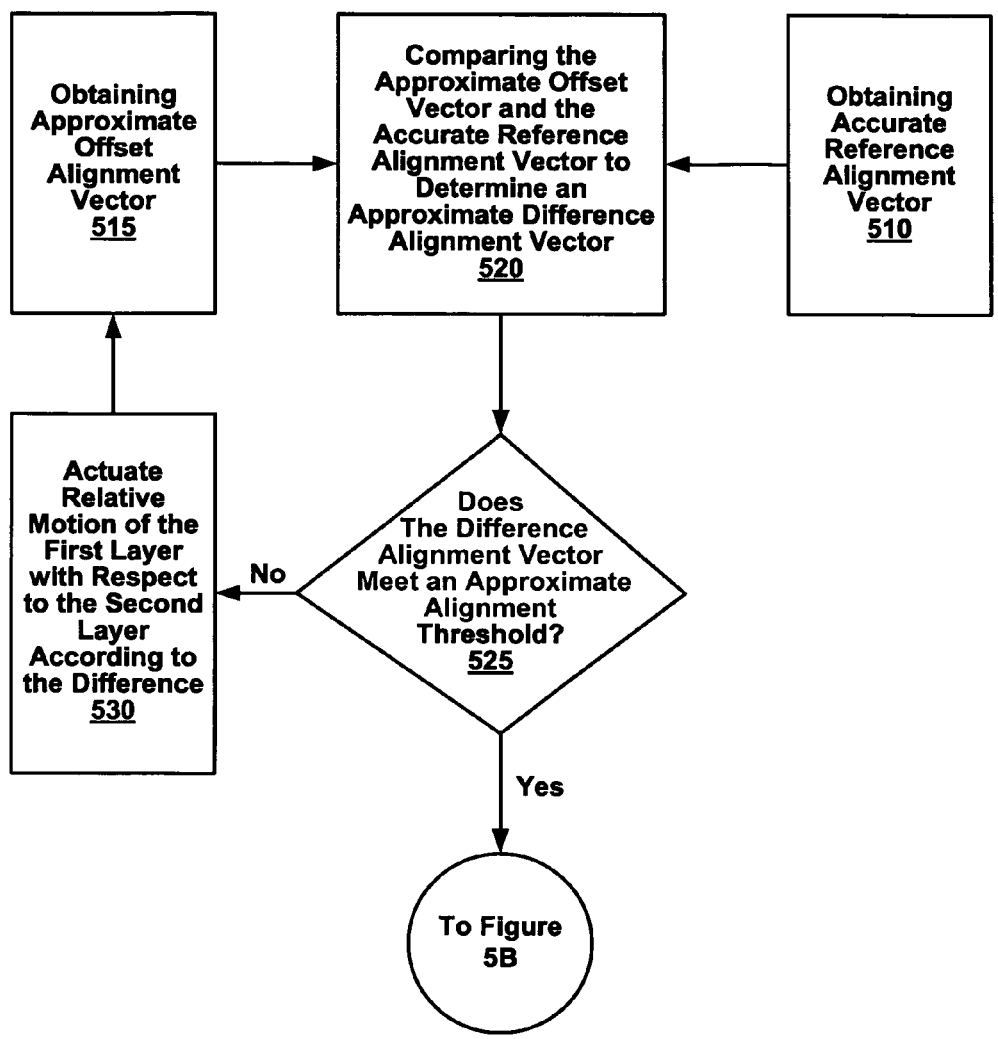
FIG. 5A is a diagram illustrating a method for determining an approximate alignment between two or more material layers, in accordance with one embodiment of the present invention.
Figure 5B:
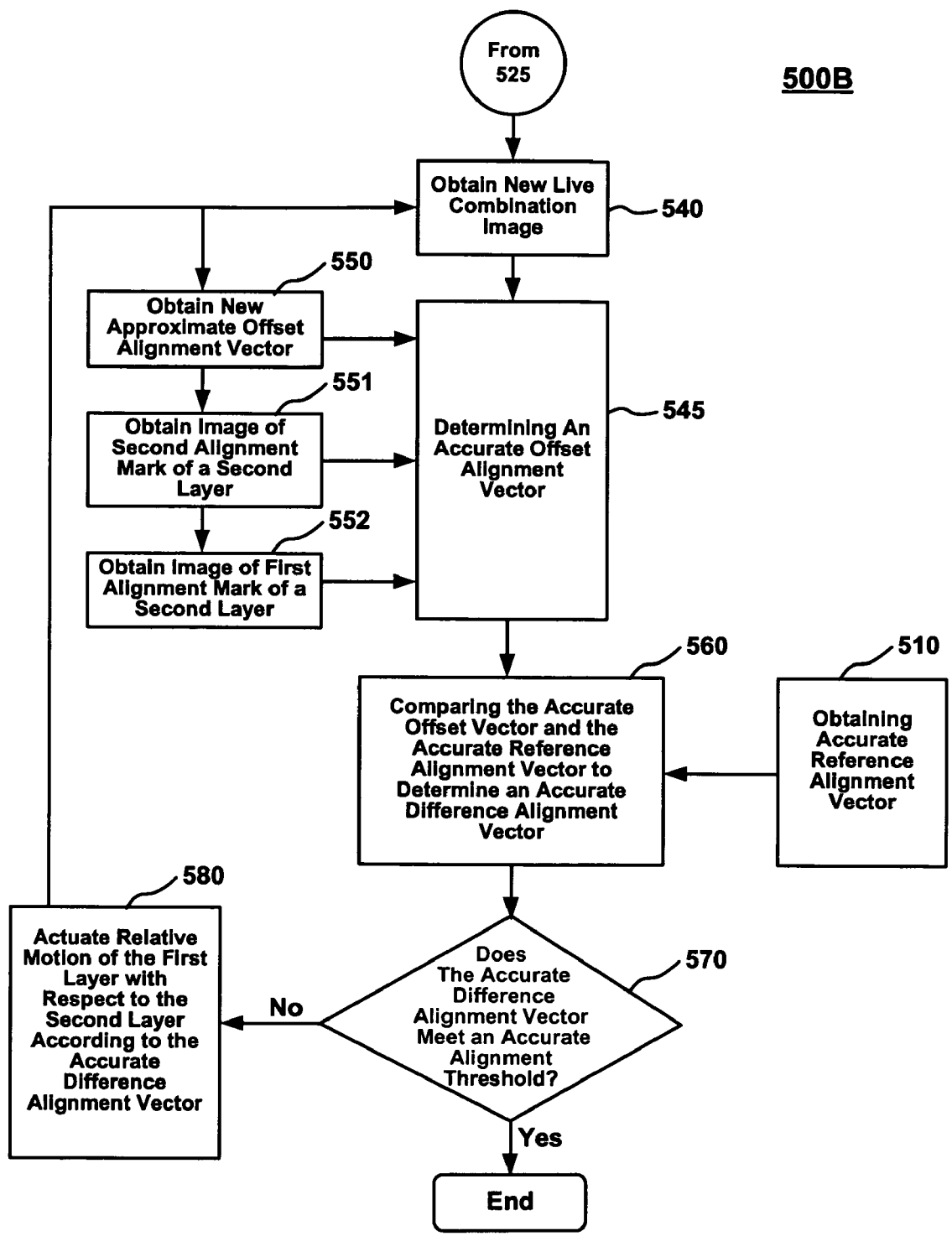
FIG. 5B is a diagram illustrating a method for determining an accurate alignment between two or more layers, in accordance with one embodiment of the present invention.

FIGS. 5A and 5B illustrate methods for performing alignment between two or more layers, in accordance with embodiments of the present invention. Specifically, FIG. 5A illustrates a method for performing approximate alignment of two material layers, such as material layers 102 and 104 of the example in FIGS. 1A-H. FIG. 5B illustrates a method for performing accurate alignment of two material layers 102 and 104.

The embodiments of methods outlined in FIGS. 5A and 5B are capable of determining an alignment between co-located or overlapping alignment markers for purposes of aligning two or more material layers. Specifically, once the relative positioning of alignment marker 118 with respect to alignment marker 120 is known, the present embodiment is capable of orienting the two alignment markers according to reference alignment combination image 232 defining the target alignment. As an advantage, embodiments of the present invention do not need to image each of the material layers individually when presented with the features and layers overlaid on top of each other. In addition, the present embodiment is capable of calculating an offset vector to sub-pixel accuracy between alignment markers that are not identical.

For purposes of illustration only, FIGS. 5A and 5B are described in relation to the example provided in FIGS. 1A-H. That is, the methods of FIGS. 5A and 5B are described within the context of determining the alignment of alignment marker 118, of material layer 102, and alignment marker 120, of material layer 104.

However, it is understood, that in other embodiments of the present invention, the alignment of two or more material layers can be determined using the methods described in FIGS. 5A and 5B. Although the present embodiment is described with two alignment markers that are associated with two material layers, other embodiments are well suited to determining the alignment between three or more alignment markers corresponding to two or more material layers. For instance, two or more material layers may be combined to form a single material layer, in accordance with one embodiment of the present invention. The combined alignment markers are treated as a single, virtual alignment marker. As such, the two or more material layers that are combined are manipulated identically to give the virtual appearance of a single material layer and utilized to determine alignment between alignment marks of two material layers.

FIG. 5A is a flow diagram 500A illustrating a method of performing approximate alignment between two or more material layers, such as material layers 102 and 104, previously described, in accordance with one embodiment of the present invention. The approximate alignment performed in flow diagram 500A determines the proper approximate offset alignment vector 290 to use in order to generate accurate offset alignment vector 225 used to perform alignment.

At 510, the present embodiment obtains accurate reference alignment vector 235. The determination of accurate reference alignment vector was previously described in relation to FIGS. 3A, 3B, and 3C. Specifically, accurate reference alignment vector generator 230 cross-correlates a plurality of composite images based on image 150 and image 160 with reference alignment combination image 232 to determine accurate reference alignment vector 235.

In one embodiment, correction vector 234 is considered when determining accurate reference alignment vector 235 to provide further resolution and accuracy. That is, a vector corresponding to a correction factor is applied to accurate reference alignment vector 235, as previously described. For example, the correction vector 234 is added to accurate reference alignment vector 235, in one embodiment.

Additionally, at 515, the present embodiment obtains approximate offset alignment vector 290. Approximate offset alignment vector 290 provides an approximate offset between alignment marker 118 and alignment marker 120.

At 520, the present embodiment compares the approximate offset alignment vector 290 and the accurate reference alignment vector 235 to determine an approximate difference alignment vector. In one embodiment, the comparison function calculates the difference in vector form between the approximate offset alignment vector 290 and accurate reference alignment vector 235. As such, an approximate difference alignment vector defines the initial positioning of alignment markers 118 and 120.

At decision step 525, the present embodiment determines if the difference alignment vector meets a threshold. In particular, the present embodiment determines if the difference alignment vector meets an approximate alignment threshold. If the difference alignment vector meets the threshold, then this indicates approximate offset alignment vector 290 is suitable for use in determining alignment of material layers 102 and 104, as described in the method of FIG. 5B, below.

On the other hand, if the difference alignment vector does not meet the threshold, then the present embodiment proceeds to 530 in an iterative process to determine a new approximate offset alignment vector 290. Specifically, at 530, the present embodiment actuates relative motion of material layer 102 with respect to material layer 104 according to the difference alignment vector, in one embodiment.

In addition, at 515, the present embodiment obtains a new approximate offset alignment vector 515. In one embodiment, the new approximate offset alignment vector 290 comprises the previous approximate offset alignment vector combined with the difference alignment vector. In other embodiments, the new approximate offset alignment vector is separately obtained, as described previously (e.g., human based approximation). As such, in the iterative process, approximate offset alignment vector is obtained for use in aligning material layers 102 and 104.

FIG. 5B is a flow diagram 500B illustrating a method for determining accurate alignment, in accordance with one embodiment of the present invention. The flow diagram 500B continues from 525 of FIG. 5A. The method of FIG. 5A determines approximate alignment offset vector 290. The accurate alignment performed in flow diagram 500B determines the proper accurate difference alignment vector 245 used to perform alignment of material layers 102 and 104.

At 540, the present embodiment obtains a new live combination image 170 based on the alignment of material layers 102 and 104 determined in FIG. 5A. The new live combination image 170 may have been modified from a previous live combination image 170, used in an iterative process. Additionally, the present embodiment obtains image 150 of alignment marker 118 of material layer 102 at 552. Also, the present embodiment obtains image 160 of alignment marker 120 of material layer 104 at 551.

At 550, the present embodiment obtains a new approximate offset alignment vector 290. In the initial state, the approximate offset alignment vector 290 is obtained from the method of FIG. 5A.

At 545, the present embodiment determines an accurate offset alignment vector 225. In particular, accurate offset vector generator 220 generates accurate offset alignment vector 225 by utilizing a first plurality of composite images 420 that are based on image 150 and image 160. In part, a plurality of the plurality of composite images 420 is cross-correlated with combination image 170 to determine accurate offset alignment vector 225. A full discussion of the generation of accurate offset alignment vector 225 is provided in relation to FIGS. 3A and 3B.

In addition, as previously described, at 510, the present embodiment obtains a reference alignment combination image 232 of the alignment marker 118 and alignment marker 120. Reference alignment combination image 232 defines the desired or target alignment of alignment marker 118 and alignment marker 120. In particular, accurate reference alignment vector generator 230 utilizes a second plurality of composite images that are based on image 150 and image 150 to generate accurate reference alignment vector 235. In part, a plurality of the second plurality of composite images is cross-correlated with reference alignment combination image 232 to determine accurate reference alignment vector 235. A full discussion of the generation of accurate reference alignment vector 235 is provided in relation to FIGS. 3A, 3B, and 3C.

At 560, the present embodiment compares the accurate offset alignment vector 225 and the accurate reference alignment vector 235 to determine an accurate difference alignment vector 245. Specifically, in the example of FIGS. 1A-H, comparator 240 of FIG. 2 compares accurate offset alignment vector 225 and accurate reference alignment vector 235 to derive accurate difference alignment vector 245. In one embodiment, comparator 240 subtracts accurate offset alignment vector 225 from accurate reference alignment vector 235 to derive accurate difference alignment vector 245. As such, the present embodiment determines how close the relative offset of alignment markers 118 and 120 are with respect to a target alignment defined by accurate reference alignment vector 235.

At decision step 570, the present embodiment determines if the accurate difference alignment vector 245 meets an accurate alignment threshold. If the accurate difference alignment vector 245 meets the accurate alignment threshold, then this indicates the alignment between material layers 102 and 104 is satisfactory, and the process of flow diagram 500B ends.

On the other hand, if the accurate difference alignment vector 245 does not meet the accurate alignment threshold, then the present embodiment proceeds to 580. At 580, the present embodiment actuates relative motion of material layers 102 and 104 according to accurate difference alignment vector 245 to start the iterative process. For example, position control system 108 actuates relative motion of material layer 102 with respect to material layer 104 according to accurate difference alignment vector 245, in one embodiment. That is, either or both material layer 102 and material layer 104 are physically moved in relation to each other according to accurate difference alignment vector 245. As such, accurate difference alignment vector 245 provides the offset of alignment marker 118 with respect to alignment marker 120 needed to bring alignment marker 118 and alignment marker 120 in alignment according to reference alignment combination image 232.

Thereafter, the method of flow diagram 500B iteratively returns to 540 to obtain a new, modified live combination image based on the actuated motion of material layers 102 and 104. That is, once material layer 102 and material layer 104 have been moved relative to each other, alignment marker 118 and alignment marker 120 are in a new alignment state, or new configuration. That is, the previous live combination image 170 is no longer valid. As such, it is necessary to obtain the new, modified combination image 170 after actuating relative motion of material layer 102 and material layer 104 to reflect the new configuration of alignment marker 118 and alignment marker 120.

In addition, in the iterative process, at 550 a new, modified approximate offset alignment vector 290 is obtained based on the actuated motion of material layers 102 and 104. The new approximate offset alignment vector 290 is modified from the previous approximate offset alignment vector 290 used in the previous iteration step, and is obtained through many techniques, including but not limited to the following: adding the accurate difference alignment vector 245 to the previous approximate offset alignment vector 290; using the accurate reference alignment vector 235 as the new approximate offset alignment vector 290; determining a new approximate offset alignment vector 290 using techniques previously described; etc.

Thereafter, in the iterative process of the present embodiment, the operations at 551, 552, 545, 560, and 570 are performed to determine a new accurate difference alignment vector 245. Specifically, at 545 accurate offset vector generator 220 utilizes a third plurality of composite images based on image 150 and image 160 to determine a modified or new accurate offset alignment vector between alignment maker 118 and alignment marker 120. Also, cross-correlation module 221 and accurate offset alignment vector calculator 222 cross-correlates the third plurality of composite images with the new and modified combination image 170 to determine the modified accurate offset alignment vector 225. Further, at 560, the present embodiment compares the modified accurate offset alignment vector 225 and accurate reference alignment vector 235 to derive the modified accurate difference alignment vector 245. As such, the modified accurate difference alignment vector 245 provides the further iterative offset of alignment marker 118 with respect to alignment marker 120 needed to bring the alignment markers in alignment according to reference alignment combination image 232. This process is repeatable until the modified accurate difference alignment vector 245 vector meets the threshold accurate alignment threshold at 570.

Accordingly, various embodiments of the present invention disclose a method and system for determining the alignment state of two or more material layers for the purposes of alignment. Embodiments of the present invention provide the above accomplishments and also provide for the determination of the alignment state of two material layers using alignment markers that are not identical. Also, other embodiments of the present invention provide the above accomplishments and also provide for the determination of the alignment state of two material layers using alignment markers that are overlapping.

While the methods of embodiments illustrated in flow charts 3A, 3B, 5A, and 5B show specific sequences and quantity of operations, the present invention is suitable to alternative embodiments. For example, not all the operations provided for in the methods presented above are required for the present invention. Furthermore, additional operations can be added to the operations presented in the present embodiments. Likewise, the sequences of operations can be modified depending upon the application.

A method and system for determining the alignment state between two or more material layers for the purposes of performing alignment is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A computer-implemented method for determining an offset vector, said method comprising:
   obtaining an image of a first feature using a computer system;
   obtaining an image of a second feature using said computer system;
   obtaining a combination image of said first feature and said second feature using said computer system; and
   utilizing a plurality of composite images based on said image of said first feature and said image of said second feature using said computer system to determine using said computer system an accurate offset vector between said first feature and said second feature in said combination image.

2. The method of claim 1, further comprising:
   receiving an approximate offset vector corresponding to said first feature and said second feature in said combination image.

3. The method of claim 1, further comprising:
   correcting for common mode errors in at least two of said first image and said second image and said combination image.

4. The method of claim 1, wherein said utilizing a plurality of composite images comprises:
   cross-correlating a plurality of said plurality of composite images with said combination image to generate a plurality of correlation values;
   determining an extremum of maximum correlation based on said plurality of correlation values; and
   determining said accurate offset vector based on said extremum of maximum correlation.

5. The method of claim 4, wherein said determining an extremum of maximum correlation comprises:
   fitting a surface to said plurality of correlation values; and
   locating said extremum of maximum correlation of said surface.

6. The method of claim 1, wherein said utilizing a plurality of composite images comprises:
   generating an ordered array of said plurality of composite images, wherein said ordered array comprises different relative offsets of said first feature and said second feature.

7. The method of claim 6, wherein said relative offsets are based on integer pixel intervals.

8. The method of claim 6, wherein said relative offsets are based on sub-pixel intervals.

9. A computer-implemented method for determining alignment, said method comprising:
   obtaining an image of a first alignment marker on a first layer using a computer system;
   obtaining an image of a second alignment marker on a second layer using said computer system;
   obtaining a live combination image of said first alignment marker and said second alignment marker when said first layer is overlaid with said second layer using said computer system;
   utilizing a first plurality of composite images based on said image of said first alignment marker and said image of said second alignment marker using said computer system to determine using said computer system an accurate offset alignment vector between said first alignment marker and said second alignment marker in said live combination image;
   obtaining a reference alignment combination image of said first alignment marker and said second alignment mark using said computer system; and
   utilizing a second plurality of composite images based on said image of said first alignment marker and said image of said second alignment marker using said computer system to determine using said computer system an accurate reference alignment vector between said first alignment marker and said second alignment marker in said reference alignment combination image; and
   comparing said accurate offset alignment vector and said accurate reference alignment vector to derive an accurate difference alignment vector using said computer system.

10. The method of claim 9, further comprising:
    receiving an approximate offset vector corresponding to said first alignment marker and said second alignment marker in said live combination image.

11. The method of claim 9, further comprising:
    receiving a correction vector for said reference alignment combination image; and applying said correction vector to said accurate reference alignment vector.

12. The method of claim 9, wherein said receiving an alignment reference image comprises:

receiving said alignment reference image, wherein said alignment reference image is selected from the group consisting of an image of a previously optimized arrangement of said first alignment marker and said second alignment marker, and a computer aided design (C.A.D.) drawing of said first alignment marker and said second alignment marker.

13. The method of claim 9, further comprising:

comparing said accurate difference alignment vector to an accurate alignment threshold;

actuating relative motion of said first layer with respect to said second layer according to said accurate difference alignment vector when said accurate difference alignment vector exceeds said accurate alignment threshold; and obtaining a modified live combination image of said first alignment marker and said second alignment marker after said actuating relative motion;

utilizing a third plurality of composite images based on said image of said first alignment marker and said image of said second alignment marker to determine a modified accurate offset alignment vector between said first alignment marker and said second alignment marker in said modified live combination image; and comparing said modified accurate offset alignment vector and said accurate reference alignment vector to derive a modified accurate difference alignment vector.

14. The method of claim 9, wherein said utilizing a first plurality of composite images comprises:

cross-correlating a plurality of said first plurality of composite images with said live combination image to generate a plurality of correlation values;

determining an extremum of maximum correlation based on said plurality of correlation values; and determining said accurate offset alignment vector based on said extremum of maximum correlation.

15. The method of claim 9, wherein said utilizing a second plurality of composite images comprises:

cross-correlating a plurality of said second plurality of composite images with said reference alignment combination image to generate a plurality of correlation values;

determining an extremum of maximum correlation based on said plurality of correlation values; and determining said accurate reference alignment vector based on said extremum of maximum correlation.

16. The method of claim 9, wherein said utilizing a first plurality of composite images comprises:

generating a first ordered array of said first plurality of composite images, wherein said first ordered array comprises a first family of different relative offsets of said first alignment marker and said second alignment marker; and wherein said utilizing a second plurality of composite images comprises:

generating a second ordered array of said second plurality of composite images, wherein said second ordered array comprises a second family of different relative offsets of said first alignment marker and said second alignment marker.

17. A system for aligning a plurality of layers, comprising:

an imaging system configured to obtain an image of a first alignment marker on a first layer, an image of a second alignment marker on a second layer, and a live combination image of said first alignment marker and said second alignment marker when said first layer is overlaid with said second layer; and an accurate offset vector generator configured to utilize a first plurality of composite images based on said image of said first alignment marker and said image of said second alignment marker to determine an accurate offset alignment vector between said first alignment marker and said second alignment marker in said live combination image.

18. The system of claim 17, further comprising:

an accurate reference alignment vector generator configured to utilize a second plurality of composite images based on said image of said first alignment marker and said image of said second alignment marker to determine an accurate reference alignment vector between said first alignment marker and said second alignment marker in a reference alignment combination image.

19. The system of claim 18, further comprising:

a comparator configured to compare said accurate offset alignment vector and said accurate reference alignment vector to derive an accurate difference alignment vector; and a position control system for actuating relative motion of said first layer with respect to said second layer according to said accurate difference alignment vector.

20. The system of claim 17, wherein said accurate offset vector generator comprises:

a cross-correlation module configured to cross-correlate a plurality of said first plurality of composite images with said live combination image to generate a plurality of correlation values; and an accurate offset alignment vector calculator configured to determine an extremum of maximum correlation based on said plurality of correlation values, and determine said accurate offset alignment vector based on said extremum of maximum correlation.

* * * * *

UNITED STATES PATENT AND TRADEMARK OFFICE
CERTIFICATE OF CORRECTION

| | | |
|---|---|---|
| PATENT NO. | : 7,734,084 B2 | |
| APPLICATION NO. | : 11/584074 | |
| DATED | : June 8, 2010 | |
| INVENTOR(S) | : Duncan Stewart et al. | |

It is certified that error appears in the above-identified patent and that said Letters Patent is hereby corrected as shown below:

In column 20, line 48, in Claim 9, delete "mark" and insert -- marker --, therefor.

Signed and Sealed this

Twenty-eighth Day of September, 2010

David J. Kappos
*Director of the United States Patent and Trademark Office*